(12) United States Patent
Chang et al.

(10) Patent No.: US 12,326,988 B2
(45) Date of Patent: Jun. 10, 2025

(54) KNOB ON TOUCH PANEL AND RELATED CONTROL METHOD

(71) Applicant: NOVATEK Microelectronics Corp., Hsin-Chu (TW)

(72) Inventors: Yao-Chung Chang, Taichung (TW); Chih-Chang Lai, Taichung (TW); Yun-Hsiang Yeh, Hsinchu (TW); Yen-Heng Chen, Hsinchu County (TW); Chun-Yuan Liu, Tainan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/677,815

(22) Filed: May 29, 2024

(65) Prior Publication Data

US 2024/0310936 A1    Sep. 19, 2024

Related U.S. Application Data

(63) Continuation-in-part of application No. 18/530,129, filed on Dec. 5, 2023.

(60) Provisional application No. 63/534,569, filed on Aug. 24, 2023.

(51) Int. Cl.
*G06F 3/033* (2013.01)
*G06F 3/0362* (2013.01)
*G06F 3/041* (2006.01)

(52) U.S. Cl.
CPC ........ *G06F 3/0362* (2013.01); *G06F 3/04164* (2019.05); *G06F 3/04166* (2019.05)

(58) Field of Classification Search
CPC .... G06F 3/0346; G06F 3/0362; G06F 3/0393; G06F 3/041; G06F 3/04166; B60K 2360/126; B60K 2360/143
See application file for complete search history.

(56) References Cited

U.S. PATENT DOCUMENTS

| 10,921,913 | B1 | 2/2021 | Fong | |
|---|---|---|---|---|
| 11,256,376 | B2* | 2/2022 | Fong | ........................ G06F 3/044 |
| 11,709,571 | B2* | 7/2023 | Fong | ........................ H01H 25/06 |
| | | | | 345/184 |
| 11,928,271 | B1 | 3/2024 | Fong | |
| 11,983,338 | B1 | 5/2024 | Fong | |
| 12,019,813 | B2* | 6/2024 | Araki | .................... G06F 3/0393 |

(Continued)

FOREIGN PATENT DOCUMENTS

| CN | 104765492 A | 7/2015 |
|---|---|---|
| CN | 111857234 A | 10/2020 |

(Continued)

*Primary Examiner* — Joe H Cheng
(74) *Attorney, Agent, or Firm* — Winston Hsu

(57) ABSTRACT

A knob on a touch panel includes a rotary wheel, a common pad, at least one sensing pad, a plurality of connectors and a conductive ring. The rotary wheel is mounted on the touch panel. The common pad is deployed on the touch panel. The at least one sensing pad is deployed on the touch panel. Each of the plurality of connectors is coupled between the rotary wheel and one pad among the at least one sensing pad and the common pad, to control each of the at least one sensing pad to be coupled to the common pad or not through the rotary wheel according to an operation of the knob. The conductive ring is deployed on a surface of the rotary wheel, to detect a touch object.

31 Claims, 22 Drawing Sheets

(56) References Cited

U.S. PATENT DOCUMENTS

| | | | | |
|---|---|---|---|---|
| 12,164,719 | B2* | 12/2024 | Hinson | G06F 3/0393 |
| 2003/0095096 | A1 | 5/2003 | Robbin | |
| 2017/0097694 | A1* | 4/2017 | Craig | G06F 3/0362 |
| 2017/0316901 | A1 | 11/2017 | Sawada | |
| 2018/0024649 | A1* | 1/2018 | Uno | G06F 3/0338 |
| | | | | 345/174 |
| 2018/0046267 | A1* | 2/2018 | Kobayashi | G06F 3/03 |
| 2019/0337389 | A1 | 11/2019 | Barvesten | |
| 2020/0278761 | A1* | 9/2020 | Takaoka | G06F 3/044 |
| 2021/0286470 | A1* | 9/2021 | Takada | G06F 3/0445 |
| 2022/0413631 | A1 | 12/2022 | Kakinoki | |
| 2024/0019947 | A1 | 1/2024 | Hirakawa | |
| 2025/0033472 | A1* | 1/2025 | Mathews | B60K 35/10 |

FOREIGN PATENT DOCUMENTS

| | | |
|---|---|---|
| CN | 113703618 A | 11/2021 |
| CN | 114981909 A | 8/2022 |
| KR | 10-2019-0063912 A | 6/2019 |
| WO | 2023/203358 A1 | 10/2023 |

* cited by examiner

KNOB ON TOUCH PANEL AND RELATED CONTROL METHOD

CROSS REFERENCE TO RELATED APPLICATIONS

This application claims the benefit of U.S. Provisional Application No. 63/534,569, filed on Aug. 24, 2023. Further, this application is a continuation-in-part of U.S. application Ser. No. 18/530,129, filed on Dec. 5, 2023. The contents of these applications are incorporated herein by reference.

BACKGROUND OF THE INVENTION

1. Field of the Invention

The present invention relates to a knob sensing technology, and more particularly, to a knob sensing technology for a knob on a touch panel.

2. Description of the Prior Art

Touch function gradually becomes popular in the center information display (CID) systems of vehicles. When the environmental settings in a car, such as the temperature of air condition and the volume of car audio, need to be adjusted, the driver has to pay more attention to the touch positions and related setting values shown on the screen, therefore affecting the driving safety.

In order to improve the driving safety, a knob on touch display may be applied to the CID system, where a physical knob is deployed on the touch screen and is able to communicate with the sensing circuit of the touch screen. Therefore, the driver can easily adjust the settings by controlling the knob without being distracted to watch the display values.

However, in the prior art, the knob has no finger detection function, and the sensing circuit may not know whether the user is operating the knob unless a turning or press is detected. Further, the voltage in the conductor of the knob is provided from the touch sensor through coupling rather than physical short-circuit, and thus the signal amount for knob sensing may be insufficient. This reduces the reliability and performance of the system.

SUMMARY OF THE INVENTION

It is therefore an objective of the present invention to provide a novel knob on a touch panel and a related control method, in order to solve the abovementioned problems.

An embodiment of the present invention discloses a knob on a touch panel, which comprises a rotary wheel, a common pad, at least one sensing pad, a plurality of connectors and a conductive ring. The rotary wheel is mounted on the touch panel. The common pad is deployed on the touch panel. The at least one sensing pad is deployed on the touch panel. Each of the plurality of connectors is coupled between the rotary wheel and one pad among the at least one sensing pad and the common pad, to control each of the at least one sensing pad to be coupled to the common pad or not through the rotary wheel according to an operation of the knob. The conductive ring is deployed on a surface of the rotary wheel, to detect a touch object.

Another embodiment of the present invention discloses a method of controlling a knob on a touch panel. The knob has a common pad corresponding to a plurality of touch sensors on the touch panel. The method comprises steps of: detecting a touch object on the knob by outputting a touch driving signal to the plurality of touch sensors; and detecting an operation of the knob by selectively outputting the touch driving signal or a reference voltage to the plurality of touch sensors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
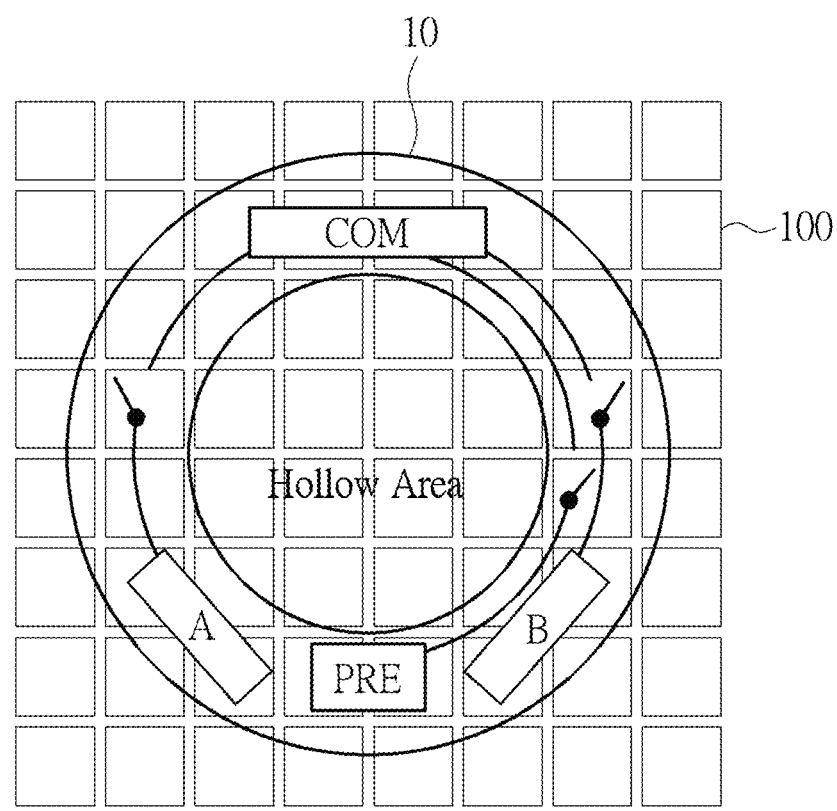
FIG. 1 is a schematic diagram of a knob according to an embodiment of the present invention.

FIG. 1 is a schematic diagram of a knob 10 according to an embodiment of the present invention. The knob 10 may be a physical knob deployed on a touch panel 100. The touch panel 100 includes a touch sensor array, where each block shown in FIG. 1 may represent a touch sensor (or a touch sensing electrode), which may serve as a unit for performing touch sensing. The knob 10 includes two sensing pads A and B, a press pad PRE, and a common pad COM. Each of the pads may be coupled to the conductive material of the knob 10 through a connector, which may include a switching element or use a switching mechanism to control the corresponding pad to be coupled to the conductive material. Based on the connection scheme, the sensing pads A and B may be coupled to the common pad COM or not based on the rotational state of the knob 10, and the press pad PRE may be coupled to the common pad COM or not based on the press operation performed on the knob 10, thereby realizing the press and rotation functions of the knob 10.

The sensing pads A and B, the press pad PRE and the common pad COM are included inside the cylinder of the knob 10 and deployed on the touch panel 100 carrying the knob 10. Each pad may be fixed on the cover glass of the touch panel 100 to be placed above one or more touch sensors of the touch panel 100, regardless of the state of the knob 10. For example, the positions of these pads may not change with the rotation of the knob 10. More specifically, the rotation of the knob 10 will change the connection relationship between these pads, so as to realize the operations of the knob 10, while the pads are still at the fixed positions.

FIG. 1 illustrates the top view of an exemplary deployment of the pads included in the knob 10, which has the shape of a hollow cylinder composed of a peripheral knob body and a hollow area. Note that the present invention is not limited thereto. In another embodiment, the knob may have a solid structure without a hole therein, and/or may have any other shape. In an embodiment, the touch panel 100 carrying the knob 10 may be a touch screen of the center information display (CID) system of a vehicle, but not limited thereto.

Figure 2:
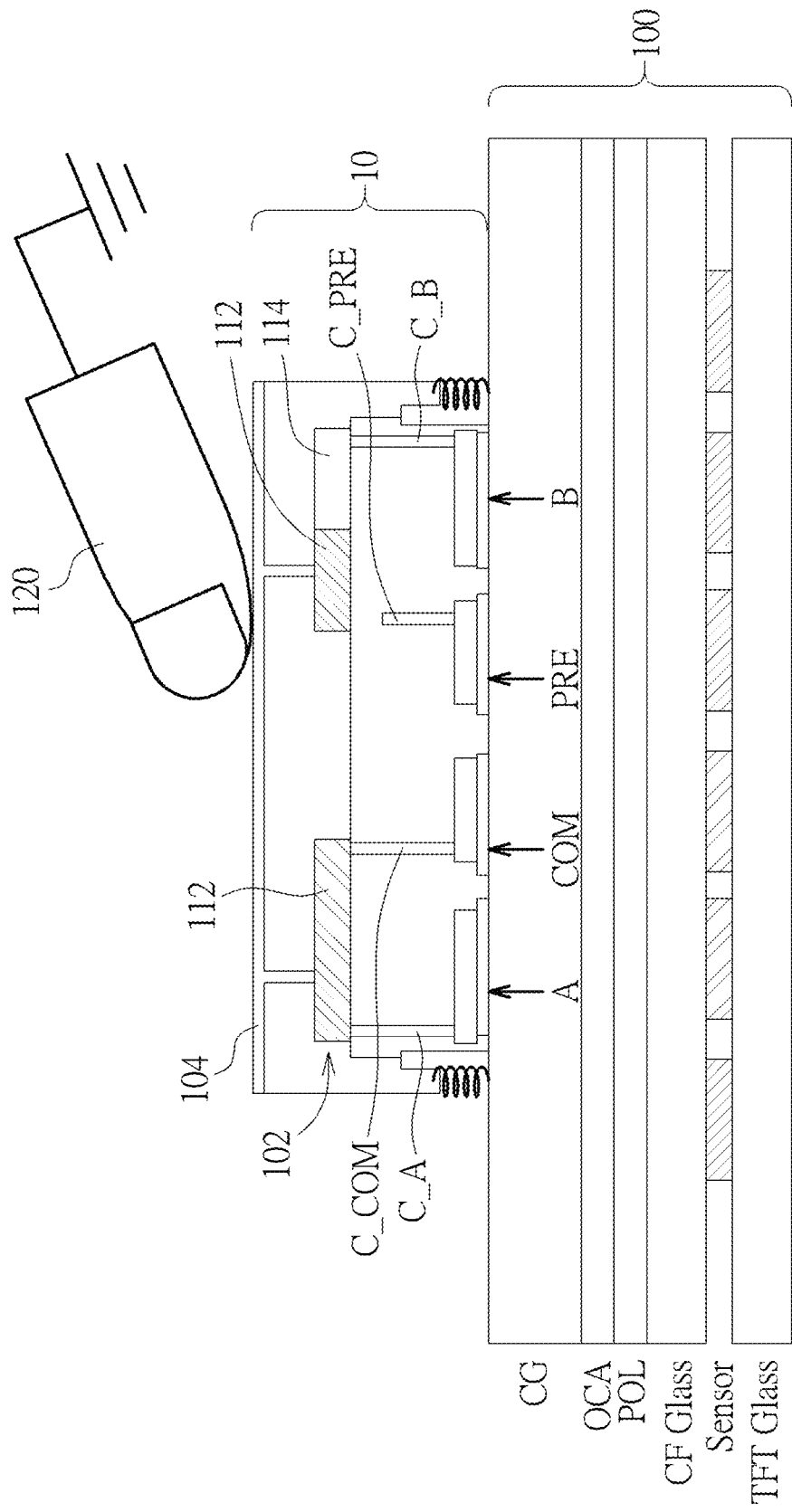
FIG. 2 illustrates the side view of the knob and the touch panel.

FIG. 2 illustrates the side view of the knob 10 and the touch panel 100. As shown in FIG. 2, the sensing pads A and B, the press pad PRE and the common pad COM are deployed on the cover glass (CG) of the touch panel 100, and thus are not electrically connected with the touch sensors below. Since the pads and the below touch sensors are close to each other but have no electric connections, the signals may be coupled through parasitic capacitance therebetween, to realize various knob sensing operations.

The knob 10 may further include a rotary wheel 102, a conductive ring 104, and several connectors. The rotary wheel 102, which forms the rotary/turning part of the knob 10, may be mounted on the touch panel 100. The conductive ring 104 may be deployed on the surface of the rotary wheel 102.

Each connector of the knob 10 may be coupled between the rotary wheel 102 and a corresponding pad. More specifically, the connector C_A is coupled between the sensing pad A and the rotary wheel 102, the connector C_B is coupled between the sensing pad B and the rotary wheel 102, the connector C_COM is coupled between the common pad COM and the rotary wheel 102, and the connector C_PRE is coupled between the press pad PRE and the rotary wheel 102. Each connector may be a pin, a wire, or a pogo pin, and may be composed of conductive materials to provide electric connections between the rotary wheel 102 and the corresponding pad.

The rotary wheel 102 includes a conductive region 112 and an insulative region 114. The conductive region 112 and the insulative region 114 may be deployed in the rotary wheel 102 appropriately, so that the connectors may be selectively connected to the conductive region 112 or the insulative region 114 according to the operation of the knob 10. For example, the connector C_COM for the common pad COM may be always connected to the conductive region 112 regardless of the rotational state of the knob 10. Each of the connectors C_A and C_B for the sensing pads A and B may be connected to the conductive region 112 or the insulative region 114. If the connector C_A or C_B is connected to the conductive region 112, the corresponding sensing pad A or B will be electrically connected (i.e., short-circuited) to the common pad COM; if the connector C_A or C_B is connected to the insulative region 114, the corresponding sensing pad A or B will be electrically isolated from the common pad COM.

In an embodiment, the operation of the knob 10 may be a rotation operation. By turning the knob 10, the knob 10 may be determined to be in one of 4 different rotational states based on the connectivity between the sensing pads A and B and the common pad COM, as could be achieved with appropriate structural design in the knob 10. In the first rotational state, both the sensing pads A and B are electrically connected to the common pad COM. When the knob 10 is turned to the second rotational state, the connection between the sensing pad A and the common pad COM is cut off, while the connection between the sensing pad B and the common pad COM keeps on. When the knob 10 is turned to the third rotational state, the connection between the sensing pad B and the common pad COM is cut off, while the connection between the sensing pad A and the common pad COM keeps on. In the fourth rotational state, both the connections of the sensing pads A and B to the common pad COM are cut off. FIG. 2 illustrates that the knob 10 is in the third rotational state, where the connector C_A for the sensing pad A is connected to the conductive region 112 and the connector C_B for the sensing pad B is connected to the insulative region 114.

Figure 3:
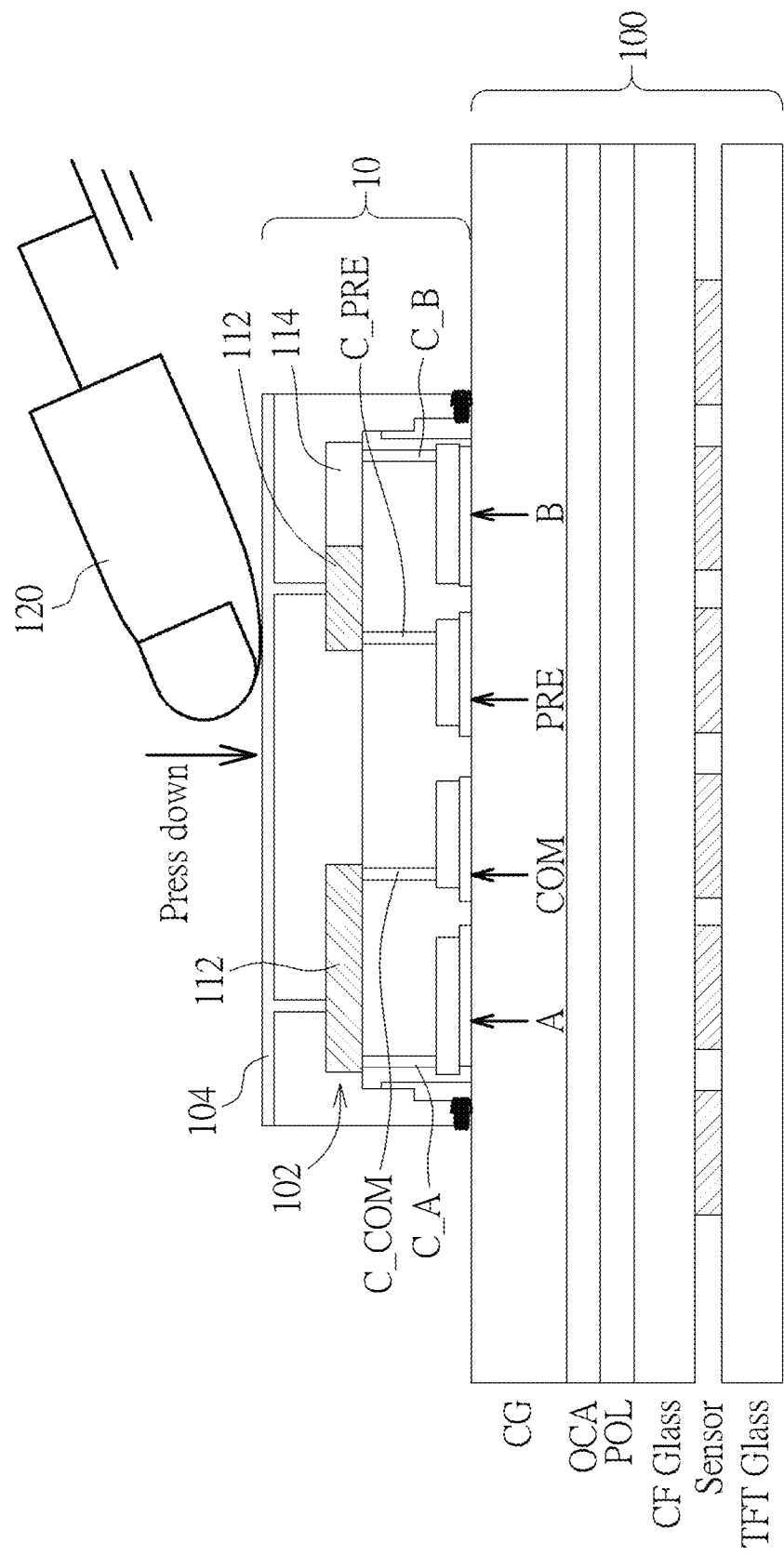
FIG. 3 illustrates the side view of the knob and the touch panel when the knob is pressed down.

The rotary wheel 102 may also be operated to realize a press operation of the knob 10, and the press pad PRE is used to detect the press operation. Note that FIG. 2 illustrates the situation that the knob 10 is not pressed; hence, the connector C_PRE for the press pad PRE is not connected to the rotary wheel 102, so the press pad PRE is not electrically connected to the common pad COM. The connector C_PRE may couple the press pad PRE to the rotary wheel 102 only when the knob 10 is pressed down. For example, as shown in FIG. 3, when the knob 10 is pressed down, the rotary wheel 102 may be pushed to a lower position, thereby contacting the tip of the connector C_PRE. In such a situation, an electric connection is formed between the press pad PRE and the common pad COM, and the related control circuit may determine whether the knob 10 is pressed accordingly.

The conductive ring 104 may be deployed on the surface of the rotary wheel 102 and physically connected to the rotary wheel 102, to detect a touch object, where the touch object may be a hand or finger of the user. Therefore, the conductive ring 104 may be always electrically connected to the conductive region 112 of the rotary wheel 102, to further be electrically connected to the common pad COM since the connector C_COM for the common pad COM is always conducted. The user (such as a car driver) may operate the knob 10 with a gloved hand or ungloved hand, and the hand or finger contacting the conductive ring 104 may be regarded as a touch object.

The conductive ring 104 may have any shape. In general, the conductive ring 104 should be deployed on the surface area of the knob 10 touchable by the touch object to perform the knob operations, so that the touch object (such as the user's finger) may contact the conductive ring 104 when the user operates the knob 10. In an embodiment, the conductive ring 104 may cover the top surface of the knob 10, or may also extend to the outer sides of the knob 10, to ensure that it can be touched by the touch object with any gesture during the operations of the knob 10.

In an embodiment, the conductive ring 104 may receive a touch sensing signal from the touch object which is contacting or approaching. For example, as shown in FIG. 2 or 3, if the user operates the knob 10 without wearing gloves, the user's finger 120 may contact the conductive ring 104, and the conductor of the finger 120 may be short-circuited to the common pad COM through the conductive ring 104 and the conductive region 112 of the rotary wheel 102. In such a situation, the voltage of the finger 120 may be supplied to the common pad COM as the touch sensing signal, thereby generating a capacitive variation on the touch sensors below the knob 10. By scanning the touch sensors, the control circuit may determine whether a touch object is contacting the knob 10 and the related operations performed on the knob 10.

If the user operates the knob 10 with a gloved hand, the user's finger 120 may approach the knob 10 without physically contacting the conductive ring 104. Therefore, the touch sensing signal of the finger 120 may still be coupled to the common pad COM through the conductive ring 104 and the conductive region 112 of the rotary wheel 102. The control circuit thereby detects the operations of the knob 10 by using the touch sensing signal received from the finger 120. In an embodiment, the touch sensing signal of the finger 120 may be combined with a touch driving signal provided from the touch sensor, to increase the signal amount and improve the reliability of knob sensing. In such a situation, the problem of insufficient signal amount for knob sensing in the prior art may be improved or solved.

As shown in FIG. 2 or 3, the knob 10 is deployed on the touch panel 100, which may be a liquid crystal display (LCD) panel and include a cover glass (CG), an optical clear adhesive (OCA) layer, a polarizer (POL), a color filter (CF) glass, and a thin film transistor (TFT) glass, where the touch sensor array may be deployed on the TFT glass. Those skilled in the art may be familiar with the structure of the LCD panel, and thus the detailed implementation of the touch panel 100 is omitted herein. Note that the present invention aims at providing the structure and control method of a knob on touch panel, where the touch panel may be realized in any possible manner without affecting the operations of the knob.

Figure 4:
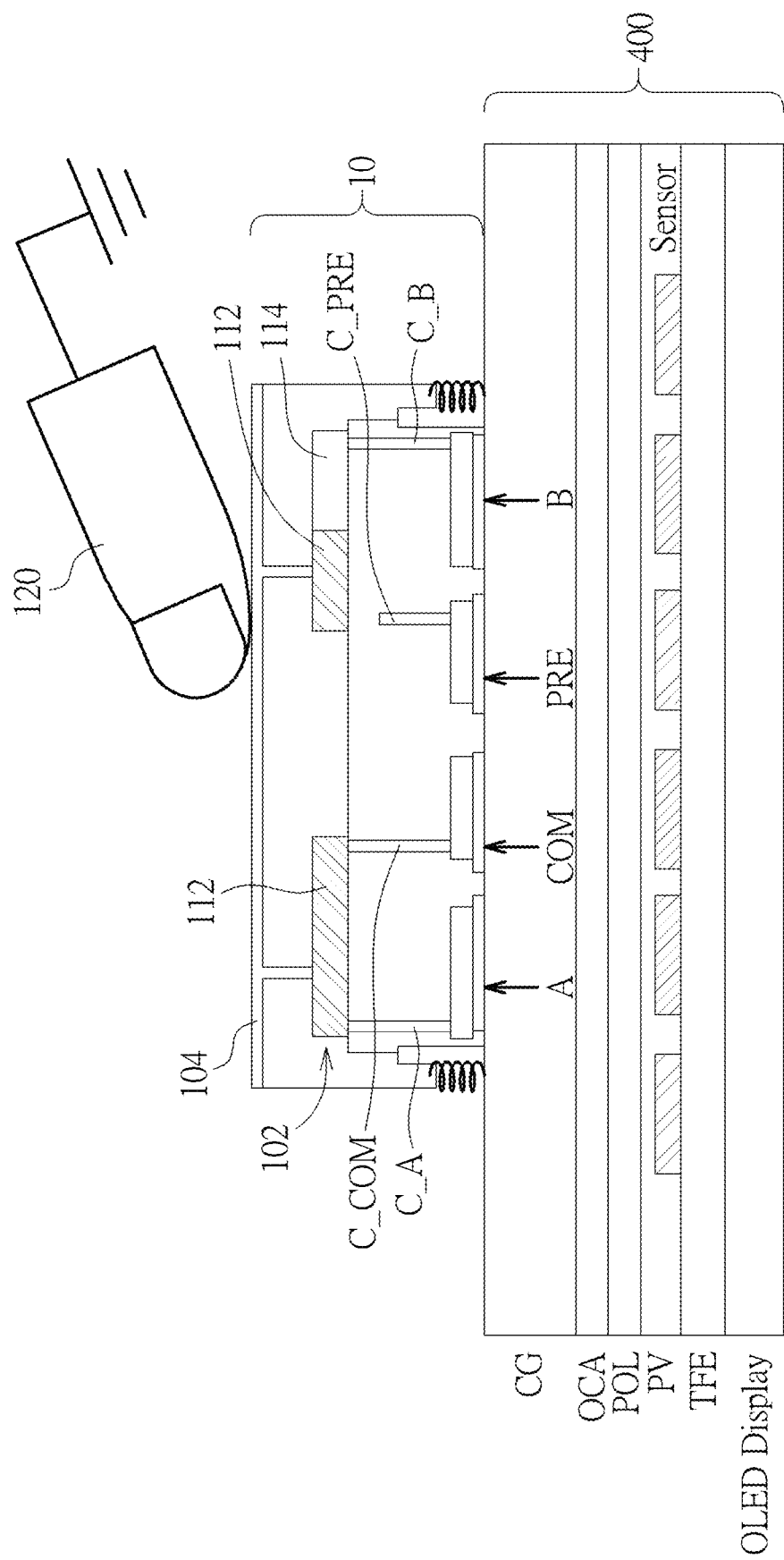
FIG. 4 illustrates the side view of the knob deployed on another touch panel.

In another embodiment, the knob may be deployed on another type of touch panel. For example, FIG. 4 illustrates the side view of the knob 10 deployed on another touch panel 400, which may be an organic light emitting diode (OLED) panel. The touch panel 400 includes a cover glass (CG), an optical clear adhesive (OCA) layer, a polarizer (POL), a passivation (PV) layer, a thin film encapsulation (TFE) layer, and an OLED display layer, where the touch sensor array may be deployed on the TFE layer. Similarly, those skilled in the art may be familiar with the structure of the OLED panel, and thus the detailed implementation of the touch panel 400 is omitted herein.

Figure 5:
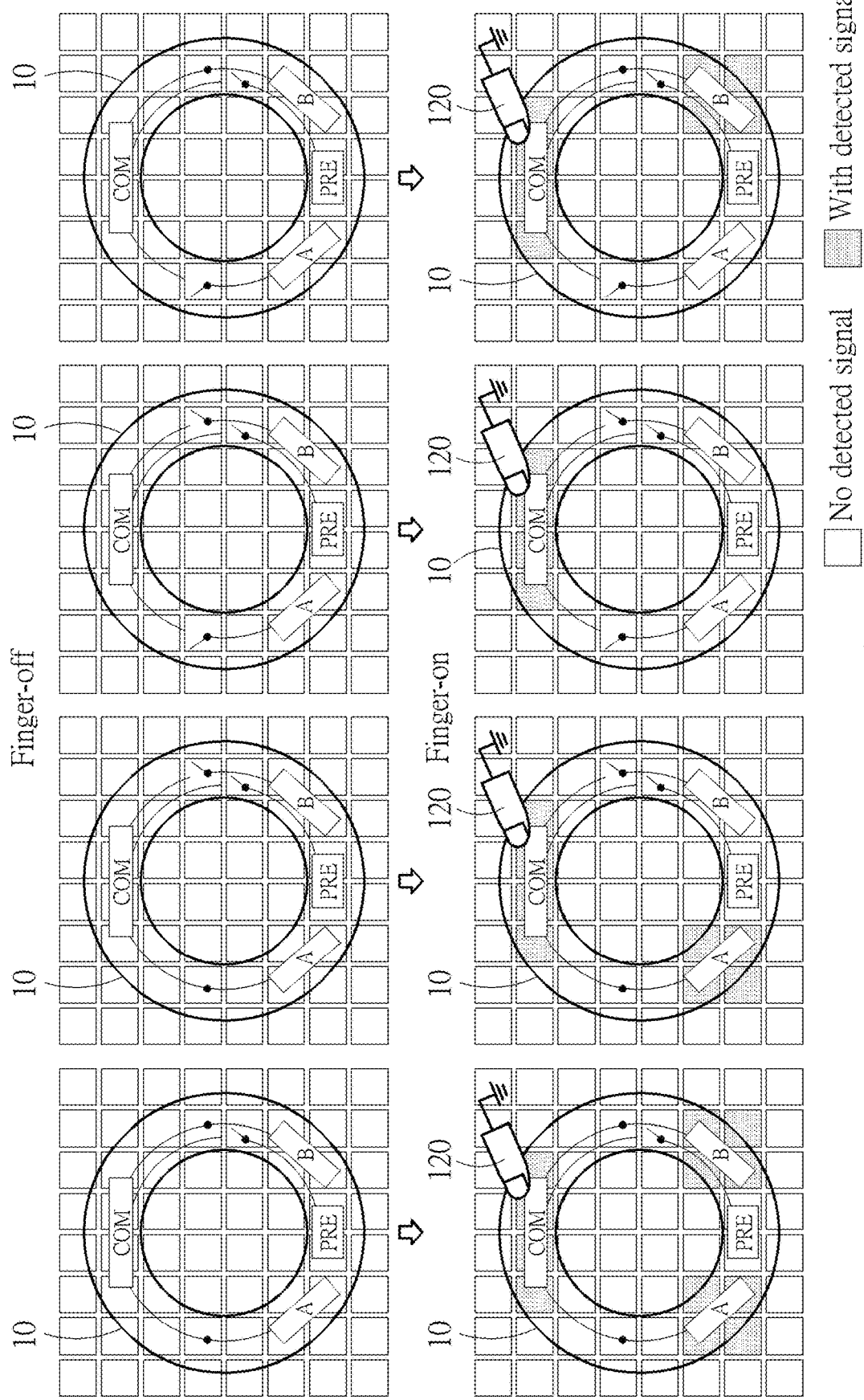
FIG. 5 illustrates the operations of detecting a touch object on the knob.

FIG. 5 illustrates the operations of detecting a touch object on the knob 10, where the touch object is a finger 120 in this embodiment. As mentioned above, the knob 10 has 4 different rotational states based on whether each of the sensing pads A and B is electrically connected to the common pad COM or not, and these 4 rotational states are shown in FIG. 5 to facilitate the illustrations.

When there is no touch object contacting or approaching the knob 10 (as the finger-off state shown in the upper half part of FIG. 5), the sensing pads A and B, the press pad PRE and the common pad COM are all floating. In such a situation, no capacitive variation is generated on the touch sensors below these pads, which means that no touch sensing signal is received.

When the finger 120 contacts or approaches the knob 10 (as the finger-on state shown in the lower half part of FIG. 5), the touch sensing signal from the finger 120 may be sent to the common pad COM through the conductive ring 104 and the rotary wheel 102. In such a situation, the touch sensors below the common pad COM may detect a capacitive variation, which means that the touch sensing signal of the finger 120 is coupled to these touch sensors. Since the sensing pads A and B are selectively coupled to the common pad COM in different states, the touch sensors below the sensing pads A and B may also detect a capacitive variation with respect to signal coupling if the corresponding sensing pad A or B is coupled to the common pad COM.

In order to simplify the finger detection operation, the control circuit only needs to determine a finger touch according to the signals detected by the touch sensors below the common pad COM. The signals of the touch sensors below the sensing pads A and B may be ignored, because these signals may appear or not based on the rotational state of the knob 10. The signal coupling appears at the common pad COM as long as a touch object contacts or approaches the knob 10 irrespective of the rotational state of the knob 10.

Since touch sensing is performed by monitoring the signals on the touch sensors below the common pad COM when the knob 10 is used to detect a touch object, these touch sensors may be applied with a touch driving signal (e.g., by a control circuit).

Figure 6:
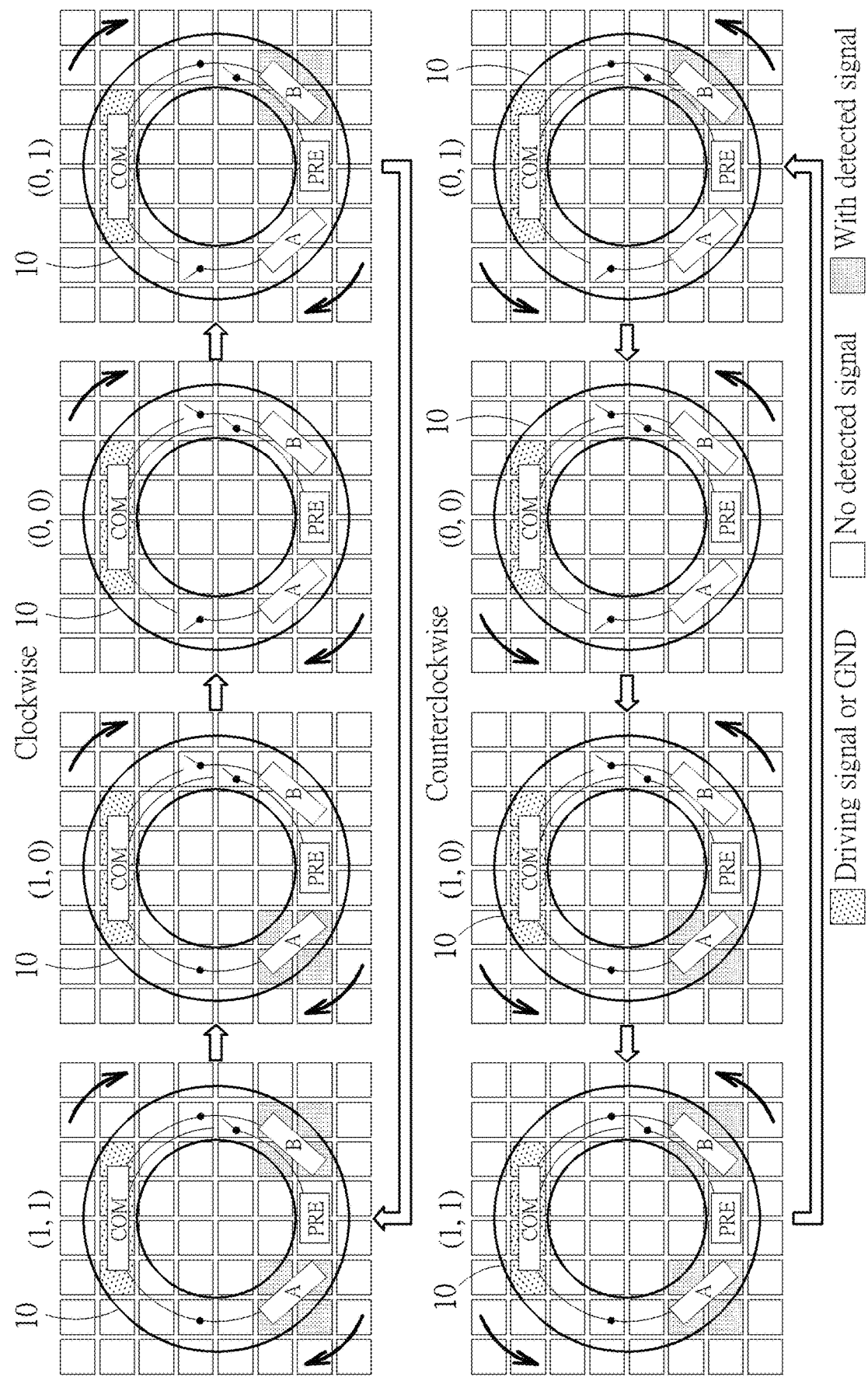
FIG. 6 illustrates the operations of rotation detection of the knob.

In an embodiment, the knob 10 may perform rotation detection. FIG. 6 illustrates the operations of rotation detection of the knob 10. As mentioned above, the knob 10 has 4 different rotational states based on whether each of the sensing pads A and B is electrically connected to the common pad COM or not, and these 4 rotational states are denoted by (1, 1), (1, 0), (0, 0) and (0, 1), respectively, with their transition schemes shown in FIG. 6. The knob 10 may be rotated clockwise or counterclockwise. During the clockwise rotation, the rotational state of the knob 10 may change in an order of (1, 1), (1, 0), (0, 0), (0, 1), (1, 1) . . . and so on; and during the counterclockwise rotation, the rotational state of the knob 10 may change in an order of (0, 1), (0, 0), (1, 0), (1, 1), (0, 1) . . . and so on. The control circuit of the knob 10 may determine the turning direction and calculate the turning angle according to the variation and sequence of the rotational states.

During the rotation detection, the touch sensor array may be applied with a touch driving signal. When the knob 10 is operated by a user's finger 120, a touch sensing signal from the finger 120 may be sent to the common pad COM, and may also be sent to the sensing pads A and/or B if the connector between the sensing pad and the common pad COM is conducted. As mentioned above, if a connector is connected to the conductive region 112 of the rotary wheel 102, the corresponding sensing pad will be electrically connected to the common pad COM and the corresponding touch sensors will detect the sensing signal; if a connector is connected to the insulative region 114 of the rotary wheel 102, the corresponding sensing pad will be isolated from the common pad COM and the corresponding touch sensors will not detect the sensing signal. Based on whether the touch sensors below the sensing pads A and/or B detect the touch sensing signal (e.g., with a capacitive variation), the rotational state of the knob 10 may be determined. In other words, the rotational state may be detected by receiving the touch sensing signal from the finger 120.

In addition, the touch sensors below the common pad COM may be applied with the touch driving signal or a reference voltage. In an embodiment, the reference voltage is a ground voltage (GND).

As mentioned above, the user may operate the knob 10 with a gloved hand or ungloved hand. Assuming that the touch sensors below the common pad COM is applied with the touch driving signal, if the user operates the knob 10 with an ungloved hand, the finger 120 of the user will nakedly contact the conductive ring 104 of the knob 10; hence, the touch sensing signal of the finger touch may be directly sent to the common pad COM through the conductive ring 104 and the conductive region 112 of the rotary wheel 102. The rotation detection can thereby be performed by using the touch sensing signal which is sent through these conductors therebetween. If the user operates the knob 10 when wearing a glove, the finger 120 of the user will not directly contact the knob 10, but may approach the knob 10 with an extremely small distance; hence, the touch driving signal of the finger touch may be coupled to the conductors of the knob 10, including the conductive ring 104 and the conductive region 112 of the rotary wheel 102, and then sent to the common pad COM. The rotation detection can thereby be performed by using the touch sensing signal which is coupled from the finger 120 of the user.

Assuming that the touch sensors below the common pad COM receives the reference voltage such as the ground voltage, if the user operates the knob 10 with an ungloved hand, the finger 120 of the user will nakedly contact the conductive ring 104 of the knob; hence, the touch driving signal of the finger touch may be directly sent to the common pad COM through the conductive ring 104 and the conductive region 112 of the rotary wheel 102. The rotation detection can thereby be performed by using the touch sensing signal which is sent through these conductors therebetween. If the user operates the knob 10 when wearing a glove, the finger of the user will not directly contact the knob 10, but may approach the knob 10 with an extremely small distance; hence, the touch sensing signal of the finger touch may be coupled to the conductors of the knob 10, including the conductive ring 104 and the conductive region 112 of the rotary wheel 102, and then sent to the common pad COM. The rotation detection can thereby be performed by using the touch sensing signal coupled from the finger 120 of the user, and this touch sensing signal may be combined with the signal coupled from the touch sensors below the common pad COM (since these touch sensors are applied with the reference voltage that may generate a signal on the common pad COM), in order to enhance the signal amount for rotation detection.

Figure 7:
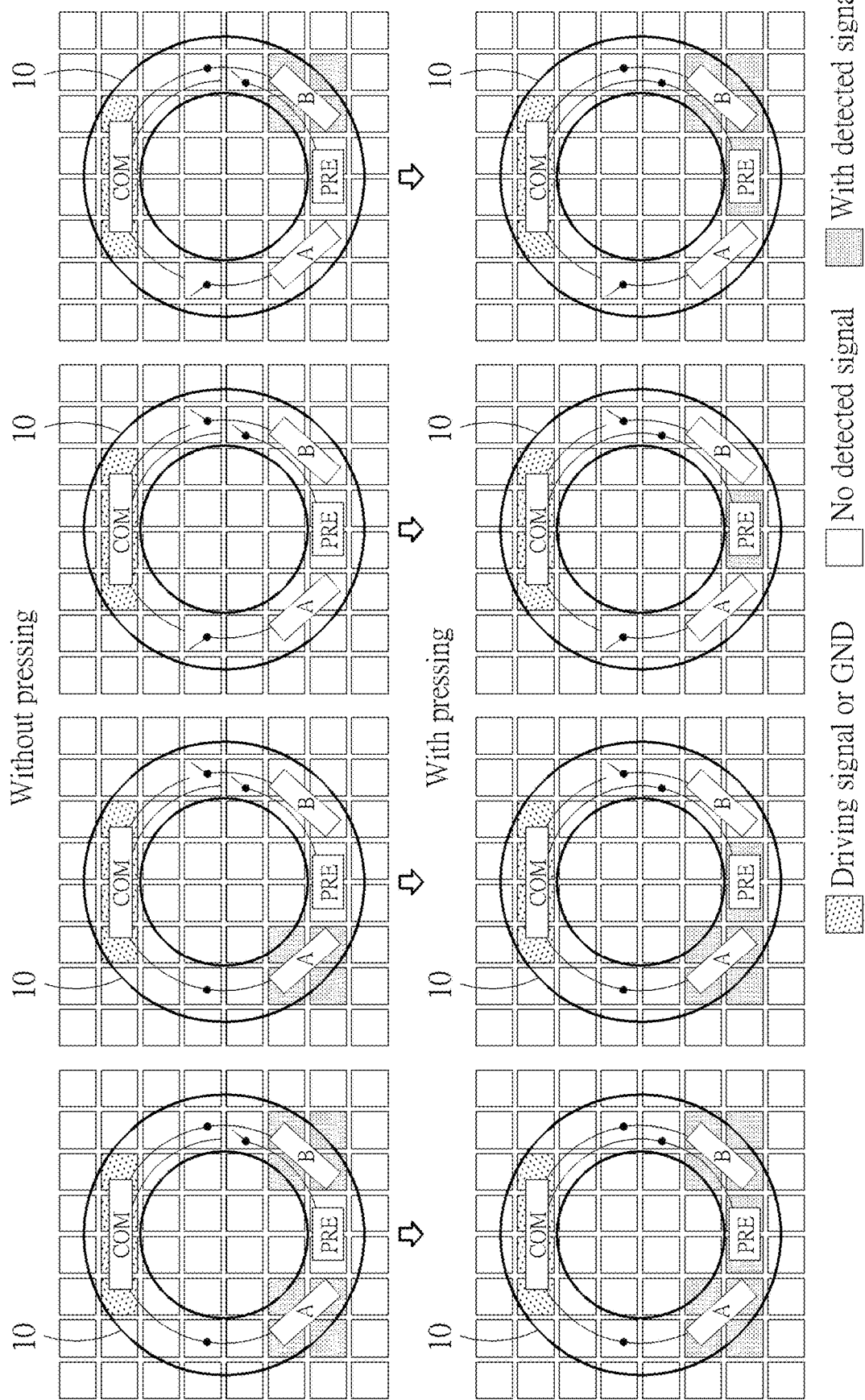
FIG. 7 illustrates the operations of press detection of the knob.

In an embodiment, the knob 10 may perform press detection by using the press pad PRE. FIG. 7 illustrates the operations of press detection of the knob 10. As mentioned above, the knob 10 has 4 different rotational states based on whether each of the sensing pads A and B is electrically connected to the common pad COM or not, and these 4 rotational states are shown in FIG. 7 to facilitate the illustrations. Referring back to FIGS. 2 and 3, the connector C_PRE for the press pad PRE may couple the press pad PRE to the rotary wheel 102 when the knob 10 is pressed down. In such a situation, the press pad PRE will be short-circuited to the common pad COM, thereby generating a capacitive variation on the touch sensors below the press pad PRE. The control circuit may determine whether the knob 10 is pressed down according to the signals detected by the touch sensors below the press pad PRE.

As shown in FIG. 7, the press detection may be performed irrespective of the rotational state of the knob 10. More specifically, the upper half part of FIG. 7 shows the sensing behaviors of the knob 10 without pressing, where no sensing signal is detected on the touch sensors below the press pad PRE. The lower half part of FIG. 7 shows the sensing behaviors of the knob 10 when it is pressed down, where the touch sensors below the press pad PRE detect a signal. In such a situation, the control circuit may perform the press detection only based on the signals detected by the touch sensors below the press pad PRE.

Similarly, during the press detection, the touch sensor array may be applied with the touch driving signal, except that those touch sensors below the common pad COM may be selectively applied with the touch driving signal or the reference voltage (e.g., ground voltage).

In addition, the touch sensing signals coupled to the touch sensors below the knob 10 may be provided from a touch object that contacts or approaches the knob 10, such as the user's finger. Similarly, the touch sensing signals may be sent through the conductors of the knob 10 when the finger contacts the knob 10, or may be coupled to the pads when the finger approaches the knob 10 (e.g., operating with a glove). Therefore, the press detection of the press pad PRE may also be performed by receiving the touch sensing signal from the touch object.

Note that the knob on a touch panel of the present invention may have any number of pads and the shapes and deployments of the pads are not limited to those described in this disclosure. The knob structure shown in FIG. 1 is merely an exemplary embodiment of the present invention. In another embodiment, there may be only one sensing pad or more than 3 sensing pads included in the knob, or the press pad may be integrated with the sensing pad, so that the sensing pad is capable of rotation detection and press detection functions.

Figure 8:
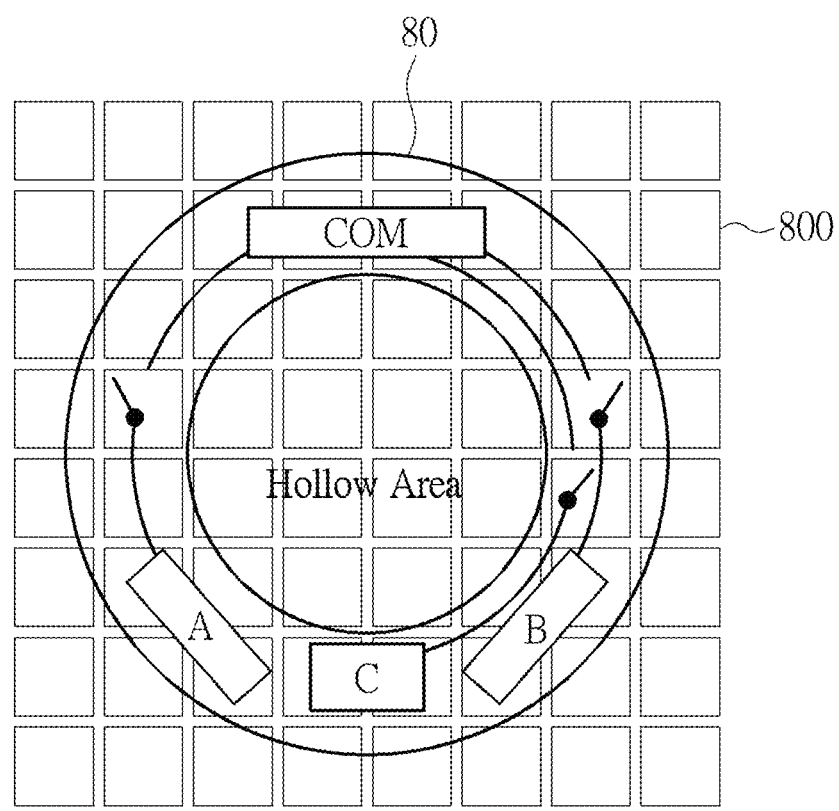
FIG. 8 is a schematic diagram of a knob according to an embodiment of the present invention.

FIG. 8 is a schematic diagram of a knob 80 according to an embodiment of the present invention. The knob 80 may be deployed on a touch panel 800 having a touch sensor array, where each block shown in FIG. 8 may represent a touch sensor (or a touch sensing electrode), which may serve as a unit for performing touch sensing. The knob 80 includes three sensing pads A, B and C and a common pad COM. Similarly, the knob 80 may also be a hollow cylinder having a hollow area as shown in FIG. 8, but a skilled person would know that the present invention is not limited thereto.

Figure 9:
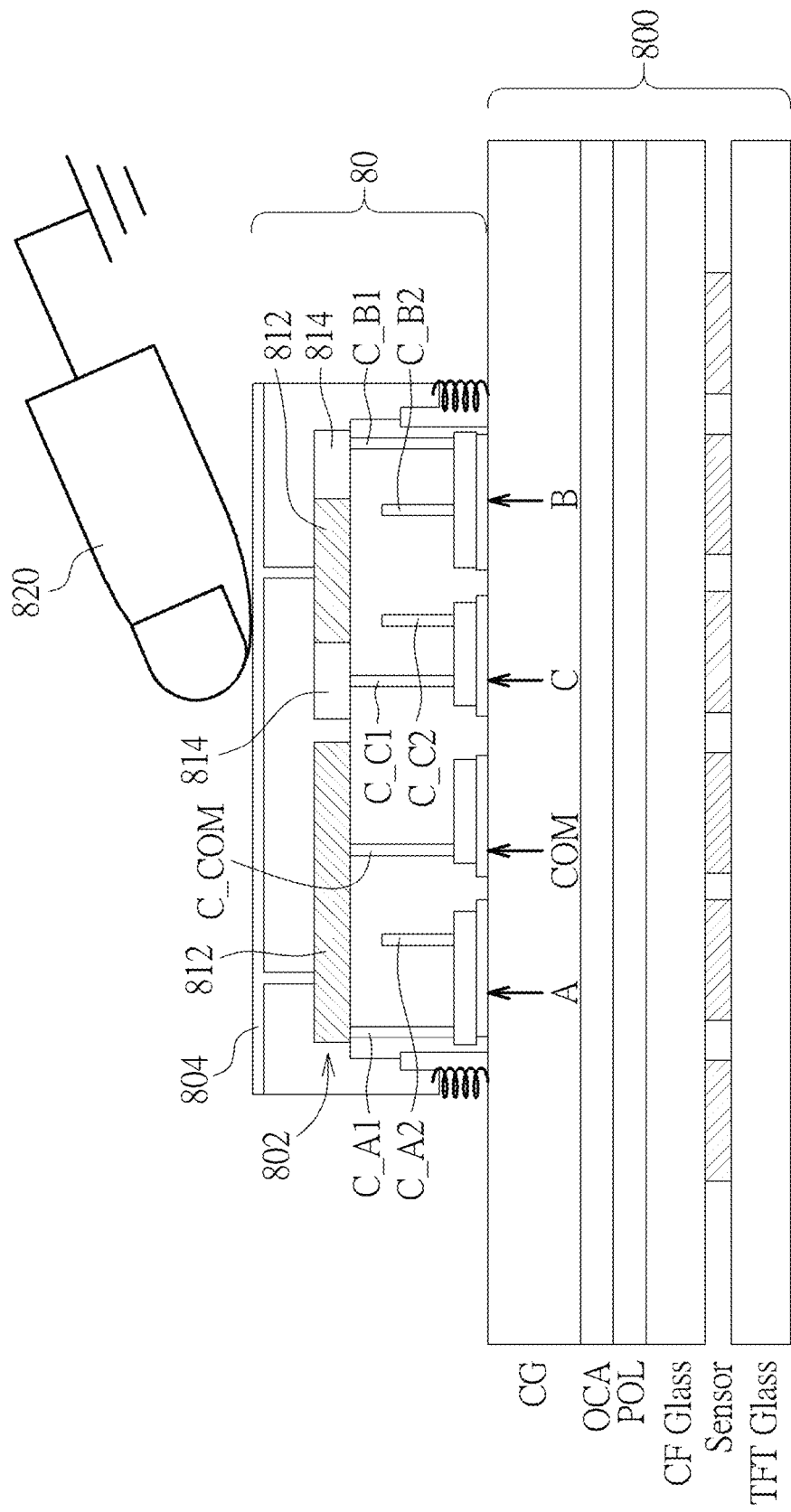
FIG. 9 illustrates the side view of the knob and the touch panel.

FIG. 9 illustrates the side view of the knob 80 and the touch panel 800. As shown in FIG. 9, the sensing pads A, B and C and the common pad COM are deployed on the cover glass (CG) of the touch panel 800, and thus are not electrically connected with the touch sensors below. Therefore, the knob sensing operations of the knob 80 may be realized in similar manners as the knob 10 shown in FIGS. 1-3.

The knob 80 may include a rotary wheel 802 and a conductive ring 804, where the conductive ring 804 may include a conductive region 812 and an insulative region 814. The detailed implementations and operations of the rotary wheel 802 and the conductive ring 804 (and the conductive region 812 and the insulative region 814 therein) are similar to those of the rotary wheel 102 and the conductive ring 104 illustrated in FIGS. 1-3, and will be omitted herein.

The knob 80 may further include several connectors, which are used for connecting the rotary wheel 802 and the corresponding pad. In this embodiment, each sensing pad is coupled to two connectors. More specifically, the connectors C_A1 and C_A2 are coupled between the sensing pad A and the rotary wheel 802, the connectors C_B1 and C_B2 are coupled between the sensing pad B and the rotary wheel 802, and the connectors C_C1 and C_C2 are coupled between the sensing pad C and the rotary wheel 802. The common pad COM is coupled to one connector C_COM, which always connects the common pad COM to the conductive region 812 regardless of the rotational state of the knob 80. In addition, each connector for the sensing pad A, B or C may be selectively coupled to the conductive region 812 or the insulative region 814 to achieve the desired knob control functions, such as the rotation operation and press operation. Similarly, each connector may be a pin, a wire, or a pogo pin, and may be composed of conductive materials to provide electric connections between the rotary wheel 802 and the corresponding pad.

Note that each sensing pad A, B or C is coupled to two connectors, of which one is used for controlling the corresponding sensing pad to be coupled to the common pad COM or not according to the rotation operation, and the other is used for controlling the corresponding sensing pad to be coupled to the rotary wheel 802 or not according to the press operation. In other words, the rotation and press operations of the knob 10 may be integrated in the same sensing pad (s).

In this embodiment, the connectors C_A1, C_B1 and C_C1, which are used for rotation detection, may be selectively connected to the conductive region 812 or the insulative region 814. If the connector C_A1, C_B1 or C_C1 is connected to the conductive region 812, the corresponding sensing pad A, B or C will be electrically connected (i.e., short-circuited) to the common pad COM; if the connector C_A1, C_B1 or C_C1 is connected to the insulative region 814, the corresponding sensing pad A, B or C will be electrically isolated from the common pad COM.

In an embodiment, the knob 80 may be configured with 3 different rotational states based on the connectivity between the sensing pad A, B and C and the common pad COM under the rotation operation, as could be achieved with appropriate structural design in the knob 80. More specifically, only one of the sensing pads A, B and C may be electrically connected to the conductive region 812 at one time. For example, in the first rotational state, the sensing pad A is electrically connected to the common pad, while the connections between the other two sensing pads B and C and the common pad COM are cut off. In the second rotational state, the sensing pad B is electrically connected to the common pad, while the connections between the other two sensing pads A and C and the common pad COM are cut off. In the third rotational state, the sensing pad C is electrically connected to the common pad, while the connections between the other two sensing pads A and B and the common pad COM are cut off. FIG. 9 illustrates that the knob 80 is in the first rotational state, where the connector C_A1 for the sensing pad A is connected to the conductive region 812 and the connectors C_B1 and C_C1 for the sensing pads B and C are connected to the insulative region 814.

Figure 10:
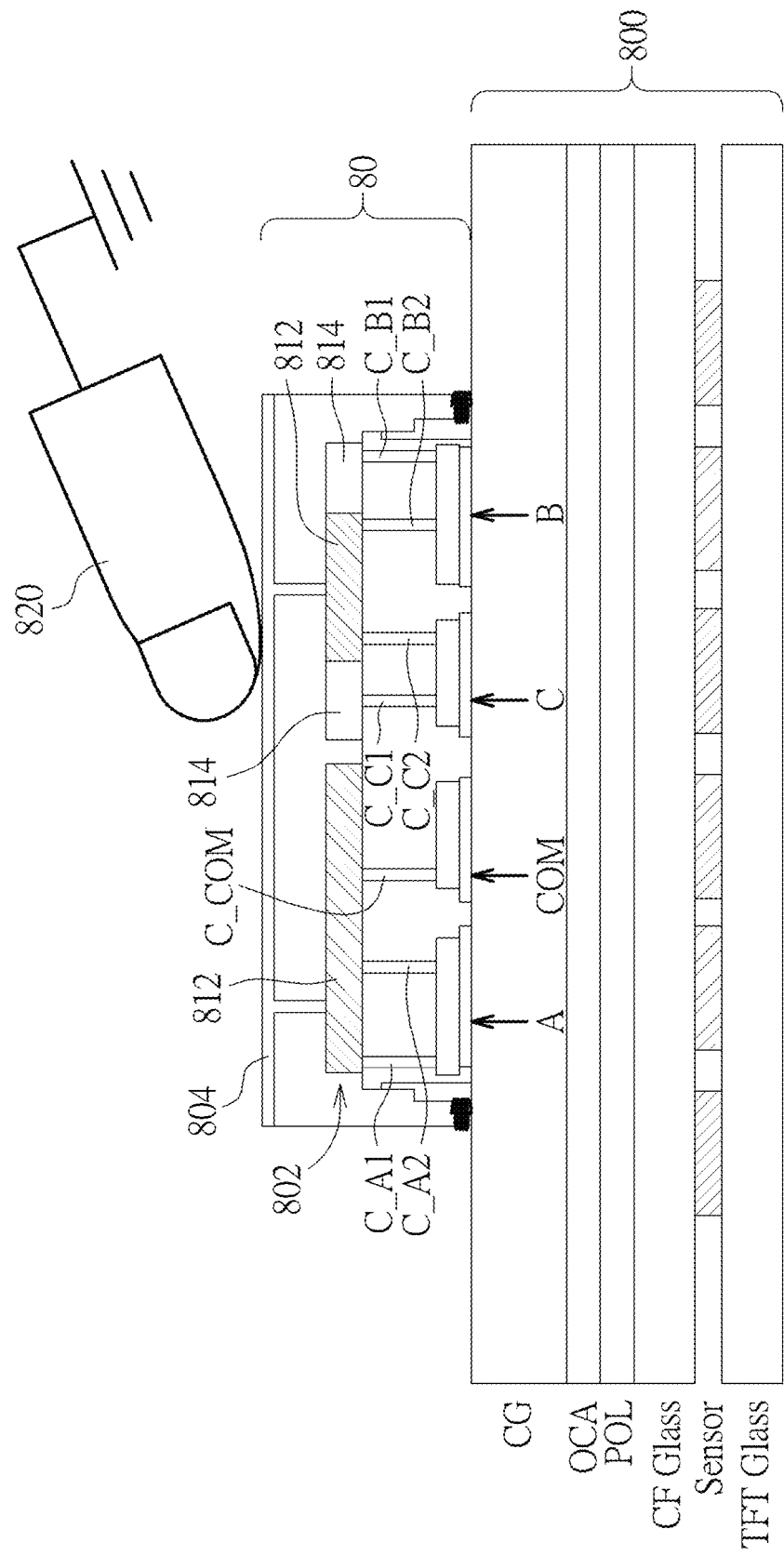
FIG. 10 illustrates the side view of the knob and the touch panel when the knob is pressed down.

In addition, the connectors C_A2, C_B2 and C_C2, which are used for press detection, may be connected to the rotary wheel 802 or not according to the press operation. Note that FIG. 9 illustrates the situation that the knob 80 is not pressed; hence, the connectors C_A2, C_B2 and C_C2 are not connected to the rotary wheel 802, so the control circuit of the knob 80 may determine that only the touch sensors below one sensing pad detect the touch sensing signal. The connectors C_A2, C_B2 and C_C2 may couple the corresponding sensing pads A, B and C to the rotary wheel 802 only when the knob 80 is pressed down. For example, as shown in FIG. 10, when the knob 80 is pressed down, the rotary wheel 802 may be pushed to a lower position, thereby contacting the tip of each of the connectors C_A2, C_B2 and C_C2. In such a situation, an electric connection is formed between the common pad COM and each of the sensing pads A, B and C. As a result, the control circuit of the knob 80 may determine that the touch sensors below the three sensing pads A, B and C all detect the touch sensing signal, and thus determine that the knob 80 is pressed down.

Further, as shown in FIG. 9, the touch panel 800 that carries the knob 80 may be an LCD panel, of which the structure is similar to the touch panel 100 shown in FIG. 2 or 3 and will not be detailed herein. In a similar manner, the touch panel 800 may also be implemented as an OLED panel, which may have a structure similar to the touch panel 400 shown in FIG. 4. In fact, the knob on touch panel of the present invention is applicable to any type of touch panel, which is not limited to those described in this disclosure.

Figure 11:
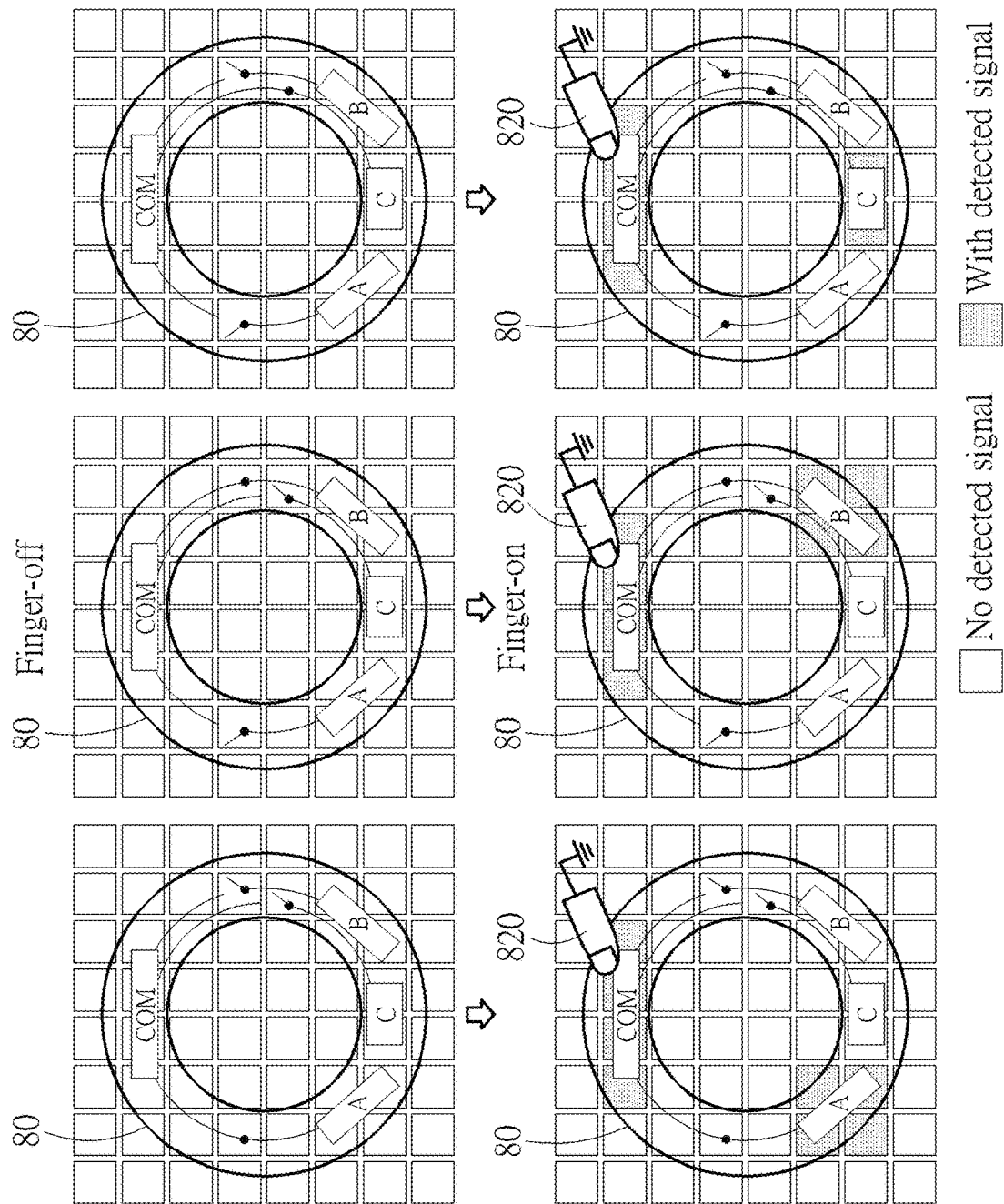
FIG. 11 illustrates the operations of detecting a touch object on the knob.

The knob 80 is also capable of finger detection function. FIG. 11 illustrates the operations of detecting a touch object (e.g., a finger 820) on the knob 80. As mentioned above, the knob 80 has 3 different rotational states based on which of the sensing pads A, B and C is electrically connected to the common pad COM, and these 3 rotational states are shown in FIG. 11 to facilitate the illustrations.

When there is no touch object contacting or approaching the knob 80 (as the finger-off state shown in the upper half part of FIG. 11), the sensing pads A, B, C and the common pad COM are all floating. In such a situation, no capacitive variation is generated on the touch sensors below these pads, which means that no touch sensing signal is received.

When the finger 820 contacts or approaches the knob 80 (as the finger-on state shown in the lower half part of FIG. 11), the touch sensing signal from the finger 820 may be sent to the common pad COM through the conductive ring 804 and the rotary wheel 802. In such a situation, the touch sensors below the common pad COM may detect a capacitive variation, which means that the touch sensing signal of the finger 820 is coupled to these touch sensors. Therefore, the control circuit may determine a finger touch according to the signals detected by the touch sensors below the common pad COM, where the signals on other touch sensors may be ignored in finger touch detection (or detection of other touch objects).

Similarly, during the finger touch detection, the touch sensors below the common pad COM are requested to be applied with a touch driving signal (e.g., by the control circuit).

Figure 12:
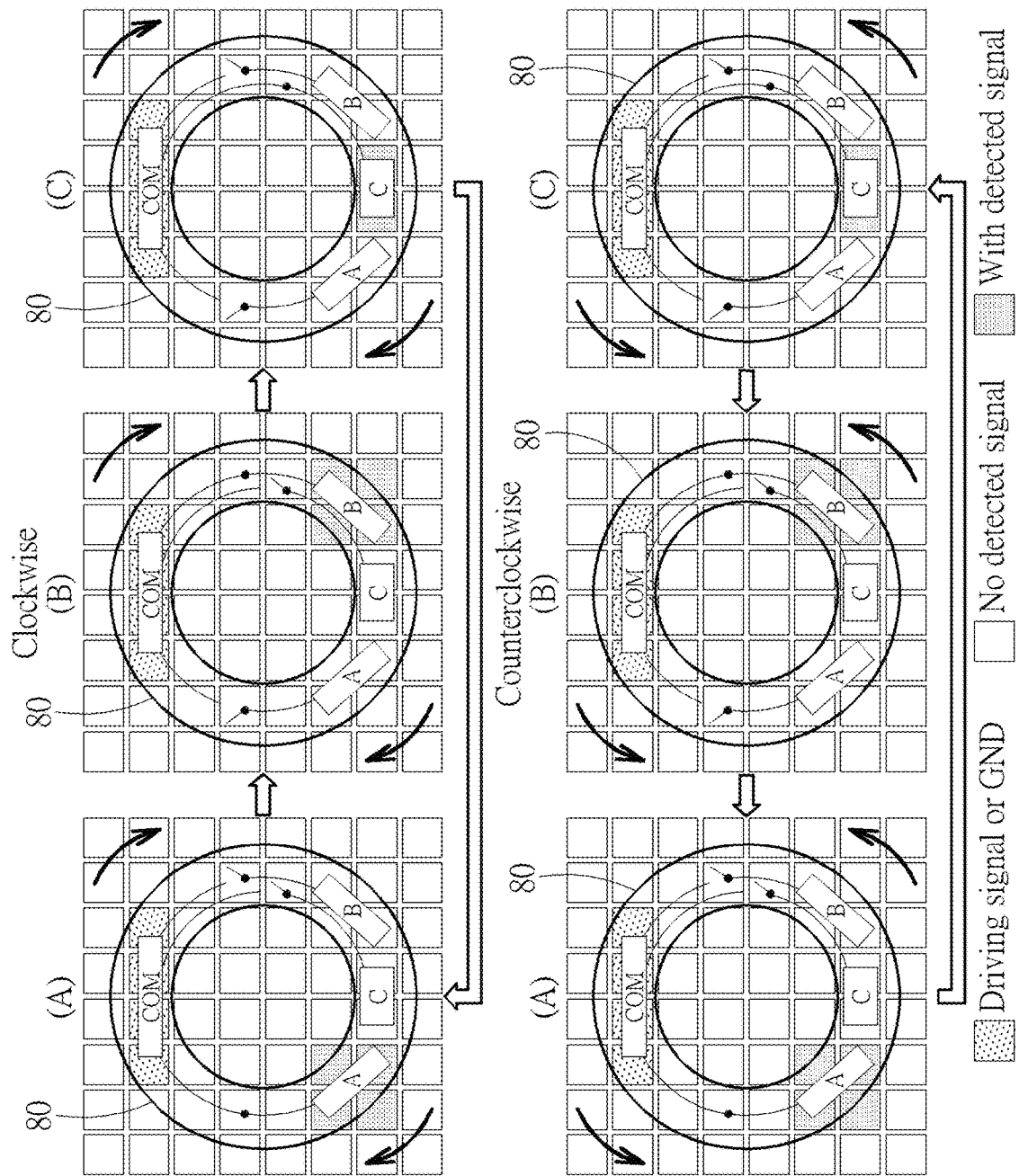
FIG. 12 illustrates the operations of rotation detection of the knob.

FIG. 12 illustrates the operations of rotation detection of the knob 80. As mentioned above, the knob 80 has 3 different rotational states based on which sensing pad A, B or Cis electrically connected to the common pad COM, and these 3 rotational states are denoted by (A), (B) and (C), respectively, with their transition schemes shown in FIG. 12. The knob 80 may be rotated clockwise or counterclockwise. During the clockwise rotation, the rotational state of the knob 80 may change in an order of (A), (B), (C), (A) . . . and so on; and during the counterclockwise rotation, the rotational state of the knob 80 may change in an order of (C), (B), (A), (C) . . . and so on. The control circuit of the knob 80 may determine the turning direction and calculate the turning angle according to the variation and sequence of the rotational states.

Similarly, during the rotation detection, the touch sensor array may be applied with the touch driving signal, except that those touch sensors below the common pad COM may be selectively applied with the touch driving signal or the reference voltage (e.g., ground voltage). The touch sensing signal for rotation detection may be provided from the touch finger 820, e.g., through conducting or coupling as described above, depending on whether the user operates the knob 80 with an ungloved or gloved hand. Based on whether the touch sensors below each sensing pad A, B or C detect the touch sensing signal (e.g., with a capacitive variation), the rotational state of the knob 80 may be determined. The detailed operations of detecting the touch sensing signal to achieve rotation detection of the knob 80 under various signal transmission ways are similar to those described above, and will not be narrated herein.

Figure 13:
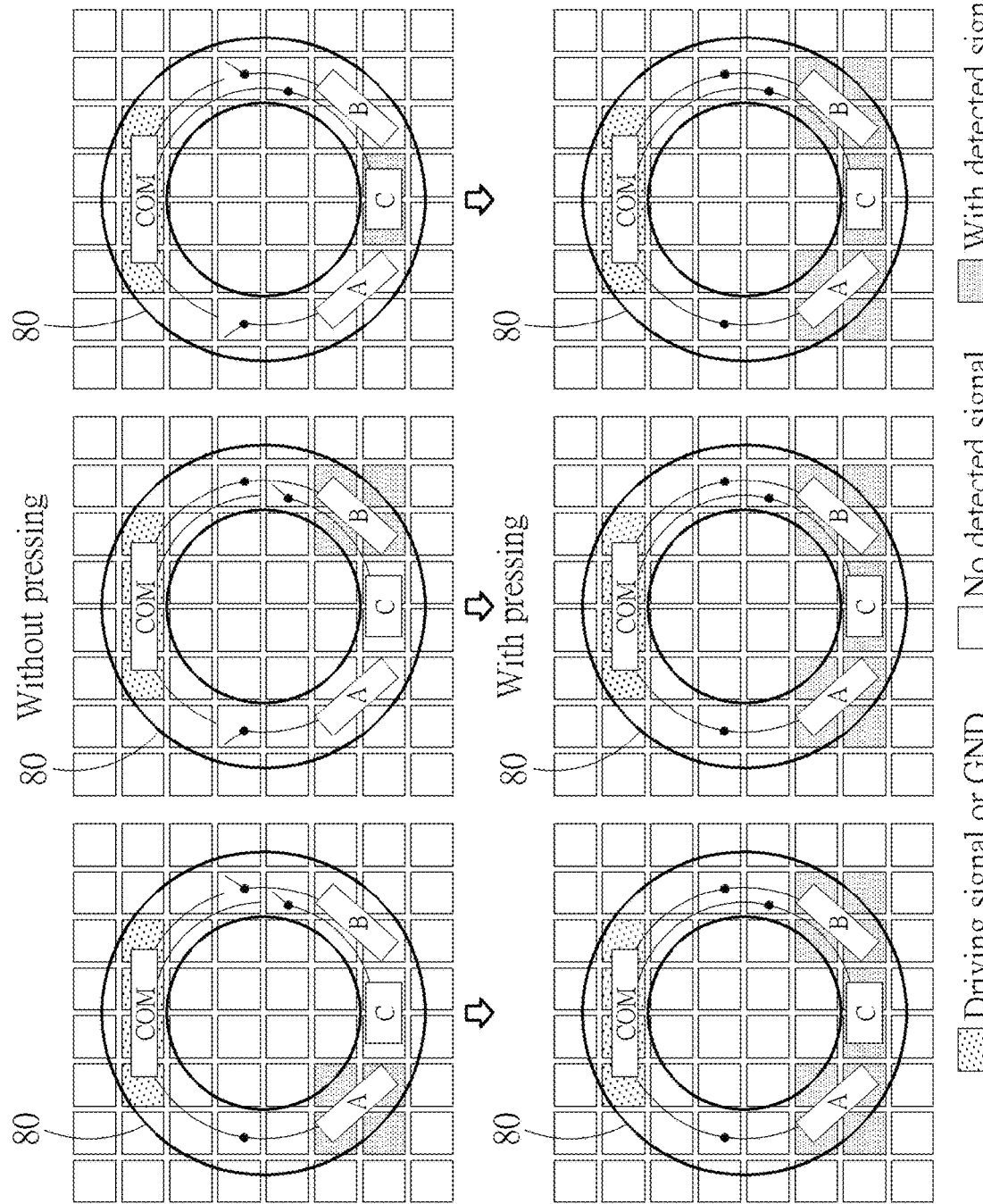
FIG. 13 illustrates the operations of press detection of the knob.

FIG. 13 illustrates the operations of press detection of the knob 80. As mentioned above, the knob 80 has 3 different rotational states based on which sensing pad A, B or C is electrically connected to the common pad COM, and these 3 rotational states are shown in FIG. 13 to facilitate the illustrations. Referring back to FIGS. 9 and 10, each of the connectors C_A2, C_B2 and C_C2 may couple the corresponding sensing pad A, B and C to the rotary wheel 802 when the knob 80 is pressed down. In such a situation, all the sensing pads A, B and C will be short-circuited to the common pad COM, thereby generating a capacitive variation on the touch sensors below the sensing pads A, B and C. The control circuit may determine that the knob 80 is pressed down only if the signals are detected on the touch sensors below all the sensing pads A, B and C.

As shown in FIG. 13, the press detection may be performed irrespectively of the rotational state of the knob 80. More specifically, the upper half part of FIG. 13 shows the sensing behaviors of the knob 80 without pressing, where the sensing signal is detected on the touch sensors below only one sensing pad A, B or C. The lower half part of FIG. 13 shows the sensing behaviors of the knob 80 when it is pressed down, where the touch sensors below all the sensing pads A, B and C detect a signal.

Similarly, during the press detection, the touch sensor array may be applied with the touch driving signal, except that those touch sensors below the common pad COM may be selectively applied with the touch driving signal or the reference voltage (e.g., ground voltage). The touch sensing signal for press detection may be provided from the touch finger 820, e.g., through conducting or coupling as described above, depending on whether the user operates the knob 80 with an ungloved or gloved hand. The detailed operations of detecting the touch sensing signal to achieve press detection of the knob 80 under various signal transmission ways are similar to those described above, and will not be narrated herein.

Figure 14:
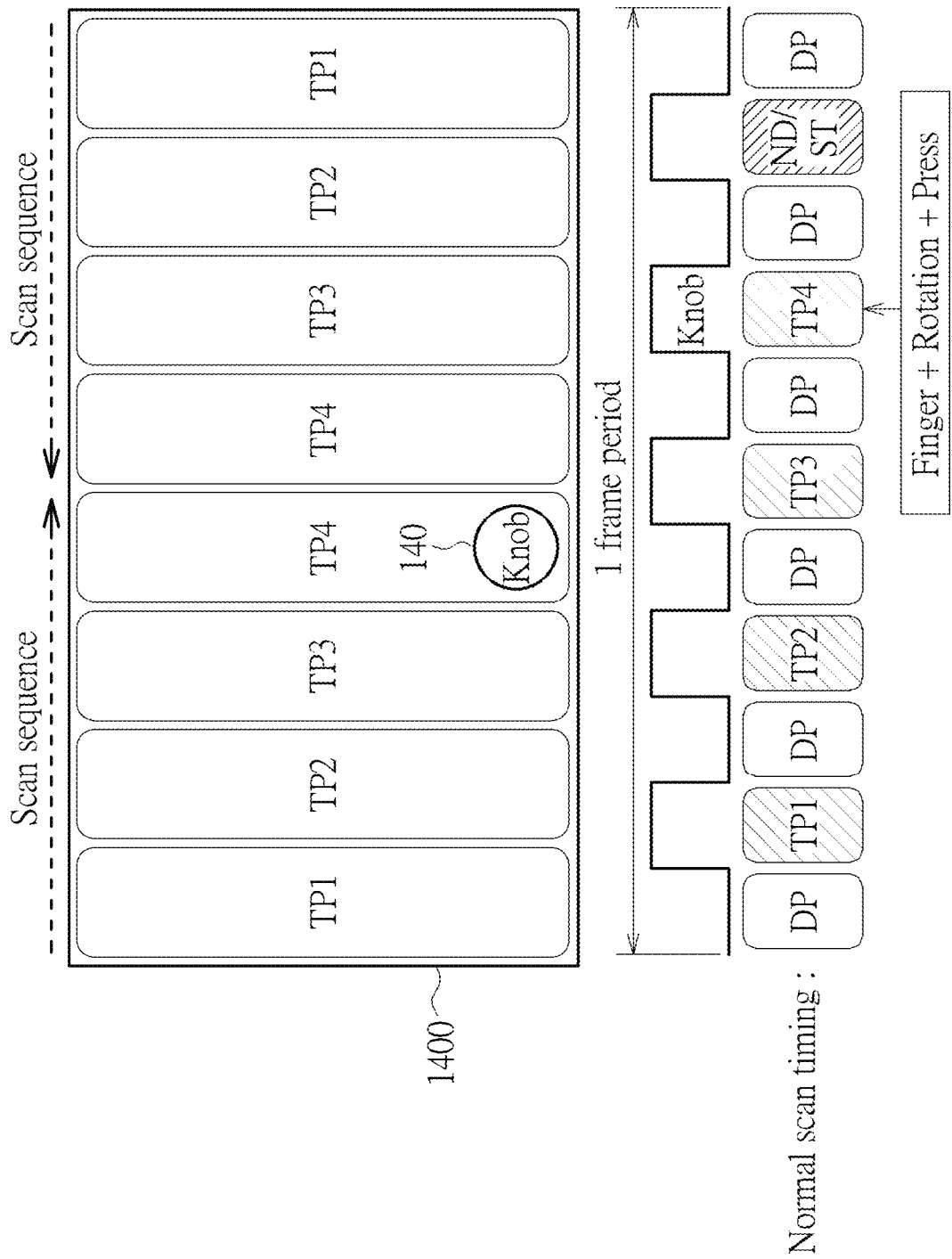
FIG. 14 is a schematic diagram of a knob on a touch panel scanned with a normal scan timing.

Since the knob of the present invention is deployed on a touch panel, the knob sensing operations may be integrated with the touch sensing operations of the touch panel, to be performed in a time slot conforming to the touch scanning operation of the touch panel. FIG. 14 is a schematic diagram of a knob 140 on a touch panel 1400 scanned with a normal scan timing. Assuming that the touch panel 1400 is an in-cell touch panel, a frame period may be divided into multiple time slots, which include several display periods DP and several touch periods TP1-TP4, in order to perform display control and touch sensing operations time-divisionally. There is an additional time slot allocated to perform noise detection (ND) and/or self-test (ST), which may be necessary to make the touch sensing be operated normally. Those skilled in the art may be familiar with the operations of ND and ST, which are omitted herein without affecting the illustrations of the present embodiment.

As shown in FIG. 14, the scan sequence of touch sensing may be from the outside in (i.e., from TP1 to TP4), and the knob 140 is deployed on the area scanned in the touch period TP4. Therefore, the detection operations of the knob 140 are preferably performed in the time slot of TP4. In detail, the finger detection, rotation detection and press detection may be all performed in the touch period TP4.

In an embodiment, the control circuit of the knob 140 may perform the finger detection, rotation detection and press detection in each frame period, irrespective of whether a finger touch is detected. Alternatively, the control circuit may perform the finger detection in usual. Only when a finger touch is detected (e.g., when a capacitive variation associated with a touch object is detected on the interested touch sensors), the control circuit will know that there may be a finger or other touch object operating the knob 140, and start to perform the rotation detection and the press detection of the knob 140.

Figure 15:
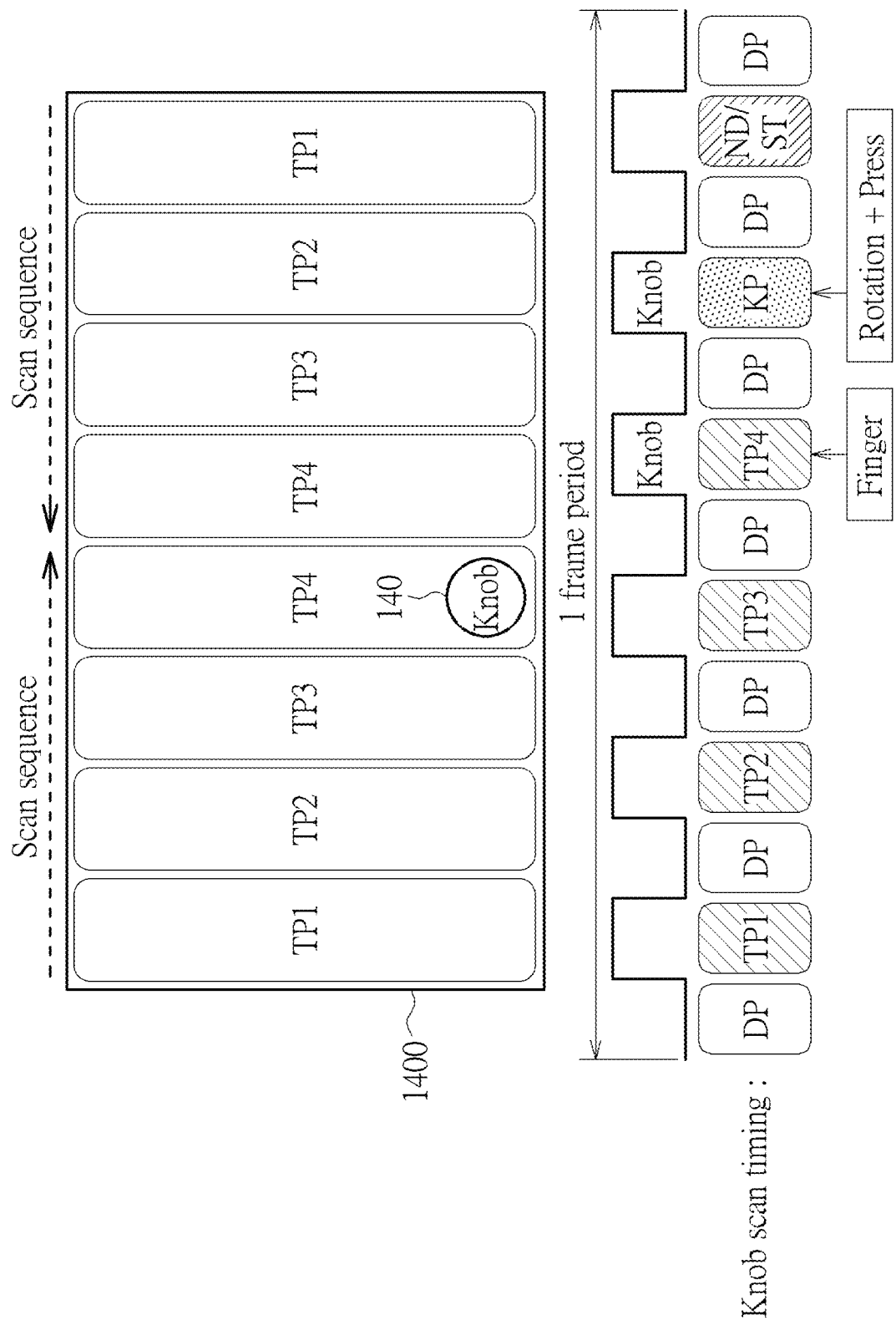
FIG. 15 is a schematic diagram of the knob on the touch panel scanned with a knob scan timing.

In another embodiment, the knob 140 may apply a knob scan timing different from the normal scan timing. FIG. 15 is a schematic diagram of the knob 140 on the touch panel 1400 scanned with a knob scan timing. In addition to the touch periods TP1-TP4, the display periods DP, and the time slot for ND/ST, the knob scan timing further includes a knob period KP, which is dedicated to the operations of the knob 140.

In an embodiment, the finger detection may still be performed in the touch period TP4, and the operations to be detected in the knob period KP may include, but not limited to, the rotation operation and the press operation. In this embodiment, the time slot of the knob period KP is after the time slot of the touch period TP4. Therefore, if a finger touch is detected in the touch period TP4, the control circuit may further perform other knob detection in the following knob period KP.

Note that the knob 140 may be switched between the normal scan timing and the knob scan timing in various manners. In an embodiment, the knob 140 may be configured with two timing tables, of which one corresponds to the normal scan timing and the other corresponds to the knob scan timing. The knob 140 may selectively apply one of the two timing tables in different situations.

Figure 16:
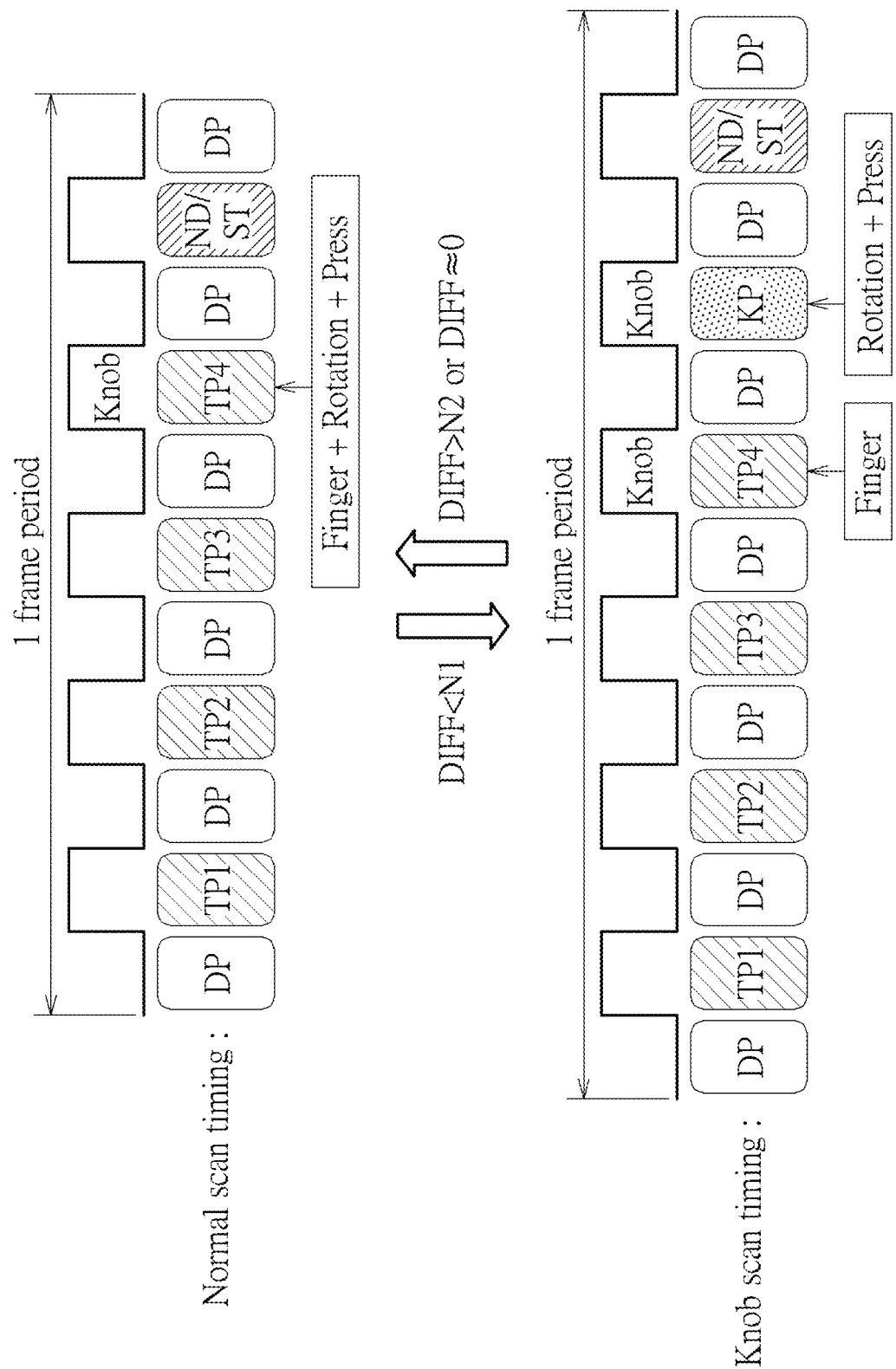
FIG. 16 to FIG. 18 illustrate the operations of the knob and the touch panel switched between the normal scan timing and the knob scan timing.

For example, in an embodiment, the knob 140 may detect a touch object (e.g., a finger) by detecting a touch sensing signal DIFF in the finger detection operation, and the scan timing may be determined according to the detection result of the touch sensing signal DIFF. As shown in FIG. 16, the knob 140 and the touch panel 1400 may be originally scanned in the normal scan timing before any touch object is detected. In other words, the knob 140 and the touch panel 1400 may be operated in the normal scan timing when the touch sensing signal DIFF is equal to or close to 0. In the normal scan timing, the touch sensors below the common pad COM may be applied with a touch driving signal, allowing the control circuit to detect the touch sensing signal from the touch object; that is, the touch object detection such as finger detection may be performed by applying the touch driving signal to the touch sensors below the common pad COM and monitoring the signals on those touch sensors.

In an embodiment, after a touch object is detected on the knob 140, the timing sequence of the knob 140 and the touch panel 1400 may be switched to the knob scan timing. The knob scan timing has a dedicated knob period KP for detecting the knob operations; this improves the reliability and performance of knob detection.

In an embodiment, after a touch object is detected, the control circuit of the knob 140 may further determine the signal amount of the touch sensing signal DIFF, as shown in FIG. 16. In this embodiment, if the touch sensing signal DIFF is determined to be smaller than a first threshold N1, which means that the signal amount may be insufficient, the timing sequence may be switched to the knob scan timing. The signal amount may be insufficient if the user operates the knob 140 with a gloved hand. In the knob scan timing, the touch sensors below the common pad COM may receive the reference voltage (e.g., ground voltage) instead of the touch driving signal when several knob operations are detected. Specifically, the reference voltage is applied in the knob period KP of the knob scan timing for detection of the knob operations, including the rotation operation and/or press operation. In such a situation, the signal amount for knob detection may not only be provided from the touch object, but also provided from the common pad COM, thereby improving the reliability and performance of knob detection. As a result, the control circuit may detect the rotation and/or press operations of the knob 140 more accurately. In the knob scan timing, the finger detection (i.e., the detection for a touch object) requires that the touch sensors below the common pad COM are applied with the touch driving signal, and thus may still be performed in the touch period TP4.

On the contrary, if the touch sensing signal DIFF is determined to be greater than a second threshold N2, which means that the signal amount may be enough, the knob 140 may be operated in the normal scan timing. The second threshold N2 may be identical to or different from the first threshold N1. In the normal scan timing, the touch sensors below the common pad COM are applied with the touch driving signal. Since the signal amount of the touch sensing signal DIFF is enough, the normal scan timing is feasible for the detection of knob operations. Note that the usage of an additional knob period KP in the knob scan timing requires more power consumption. Therefore, it is preferable to switch to the normal scan timing to save power when the signal amount is enough.

As can be seen, in the embodiments of the present invention, the touch sensors below the common pad COM may be selectively applied with the touch driving signal or the reference voltage, and may be dynamically switched between the touch driving signal and the reference voltage based on application scenarios. For example, in a first operation mode such as in (the touch period TP4 of) the normal scan timing, these touch sensors may be applied with the touch driving signal, to facilitate the finger detection. In a second operation mode such as in (the knob period KP of) the knob scan timing, these touch sensors may be applied with the reference voltage, to increase the signal amount and improve the performance of knob detection, including the detection of rotation operations and press operations. In an embodiment, the touch sensors below the common pad COM are applied with the touch driving signal or the reference voltage according to the signal amount, such as the embodiment shown in FIG. 16.

Figure 17:
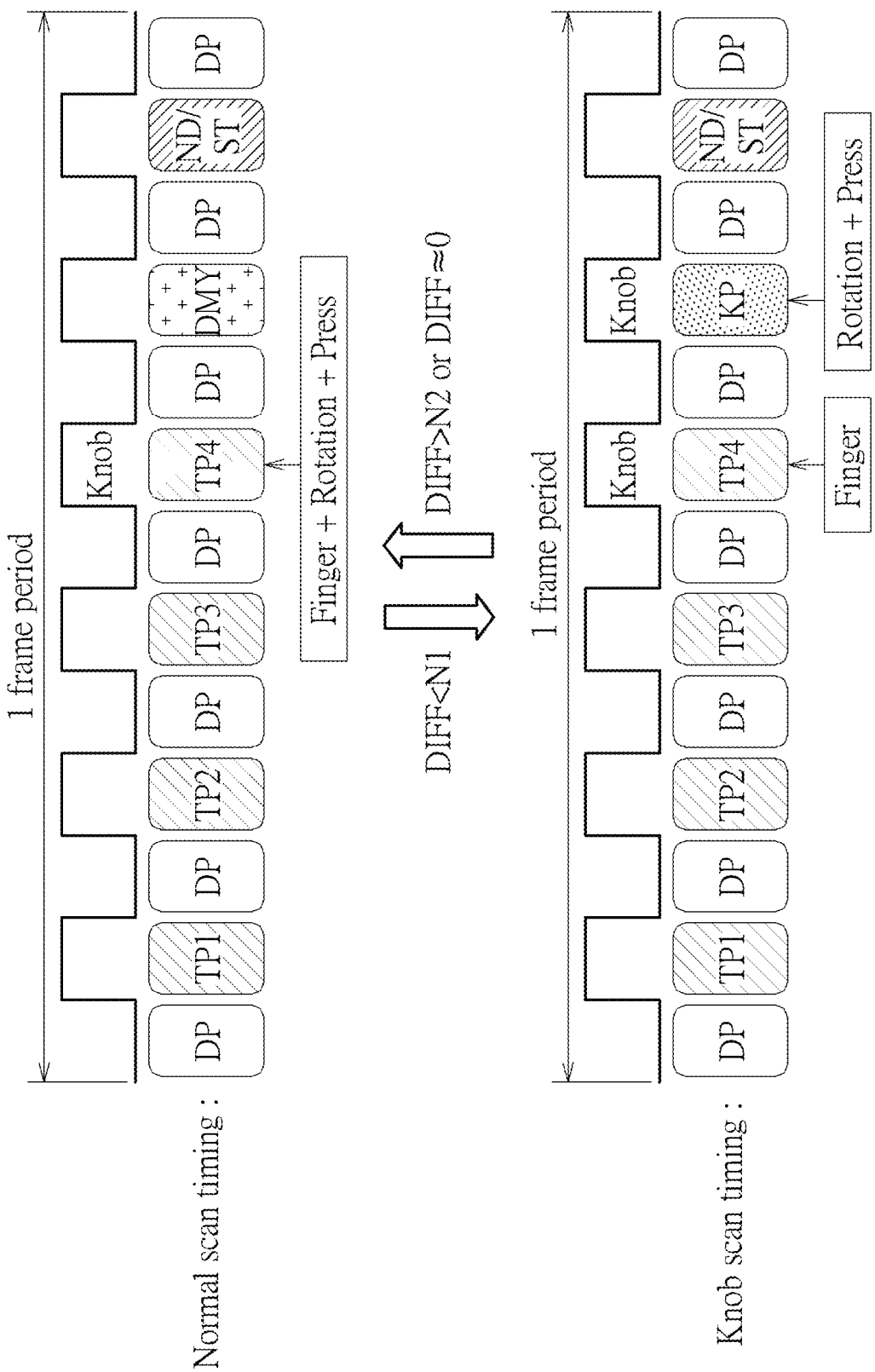

Note that the embodiment of FIG. 16 requests that the knob and the touch panel are switched between two timing tables where time slots are allocated differently. In order to simplify the timing allocation, in an embodiment, the timing may be controlled in another manner. FIG. 17 illustrates a practical example, where in addition to the display period DP, the touch period TP1-TP4, and the time slot for ND/ST, the normal scan timing is configured with an additional dummy time slot (DMY). There may be no operations performed in the dummy time slot DMY, and the dummy time slot DMY is reserved for the knob operations when the timing sequence is switched to the knob scan timing. Therefore, after entering the knob scan timing, the timing sequence needs not to be reallocated; instead, the dummy time slot DMY of the normal scan timing may be replaced by a knob period KP in the knob scan timing. Similarly, in the embodiment shown in FIG. 17, the detection operations of the knob may apply the knob scan timing when the signal amount of the touch sensing signal DIFF is smaller than the threshold N1, or apply the normal scan timing when the signal amount of the touch sensing signal DIFF is greater than the threshold N2. In addition, if the signal amount of the touch sensing signal DIFF is equal to or close to 0, which means that there is no touch object operating the knob, the knob and the touch panel may be operated in the normal scan timing.

Figure 18:
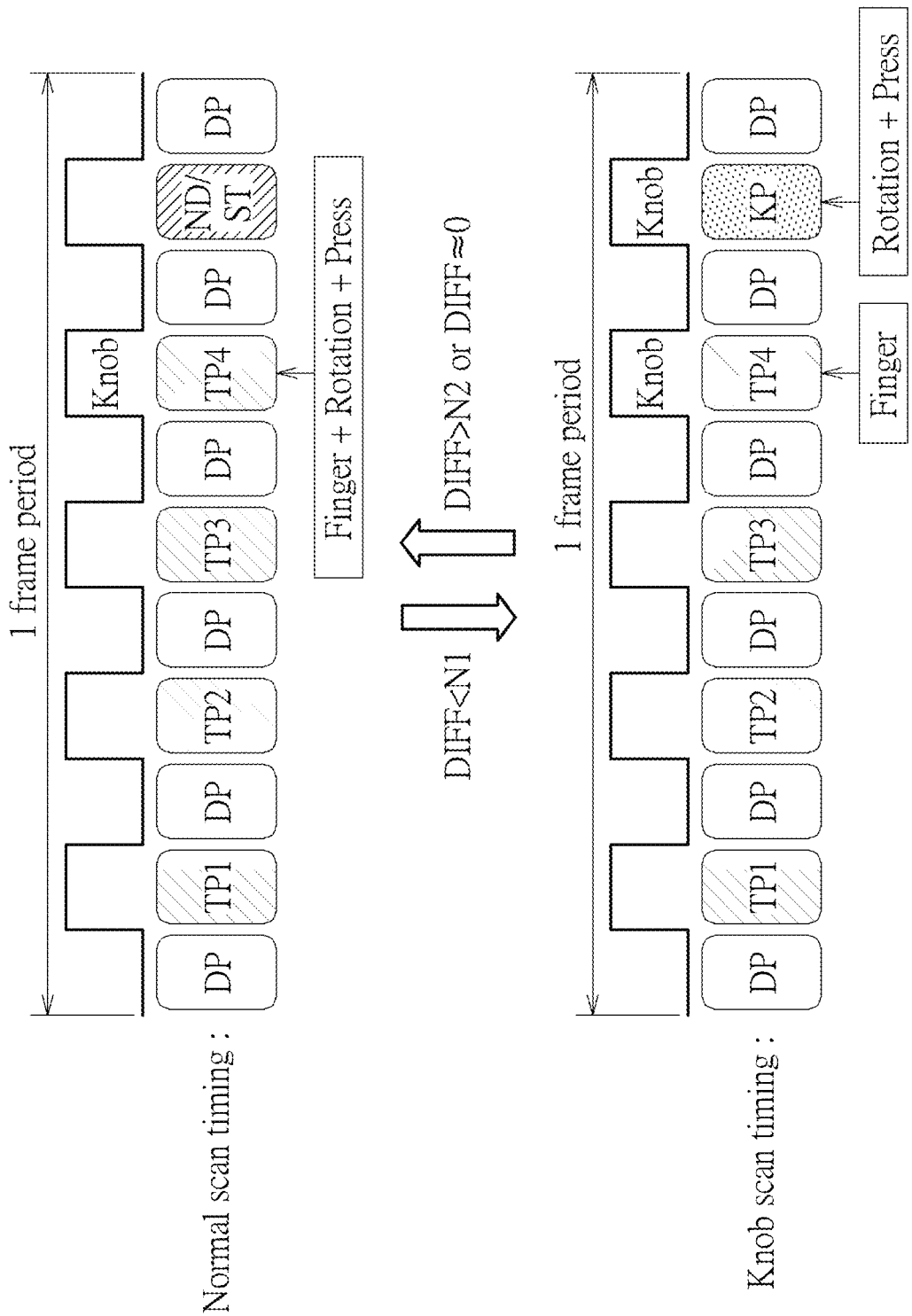

FIG. 18 illustrates the operations of the knob and the touch panel switched between the normal scan timing and the knob scan timing in another manner. In this embodiment, the normal scan timing is the same as the normal scan timing shown in FIG. 16. When the timing sequence of the knob and the touch panel enters the knob scan timing, the original ND/ST slot in the normal scan timing may be replaced by a knob period KP in the knob scan timing. In such a situation, the timing sequence needs not to be reallocated, and the knob operations such as the rotation detection and press detection may be performed in the original ND/ST slot. Similarly, in the embodiment shown in FIG. 18, the detection operations of the knob may apply the knob scan timing when the signal amount of the touch sensing signal DIFF is smaller than the threshold N1, or apply the normal scan timing when the signal amount of the touch sensing signal DIFF is greater than the threshold N2. In addition, if the signal amount of the touch sensing signal DIFF is equal to or close to 0, which means that there is no touch object operating the knob, the knob and the touch panel may be operated in the normal scan timing.

Note that the scan timing allocation described in the above embodiments are merely examples for illustration. In fact, the normal scan timing and the knob scan timing may be allocated in any appropriate manner and/or switched in other manners, which are not limited to those described in this disclosure.

Figure 19:
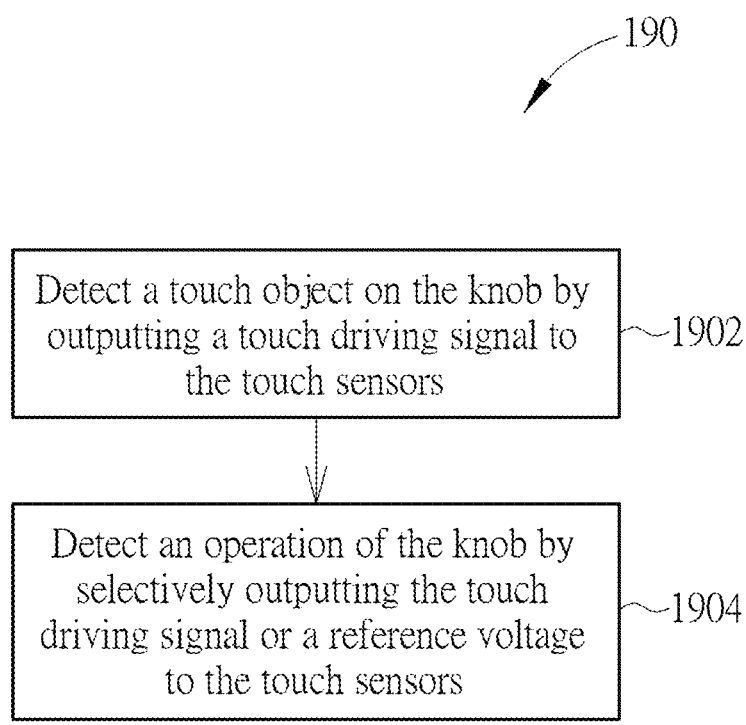
FIG. 19 is a flowchart of a control process according to an embodiment of the present invention.

The abovementioned operations of controlling the knob may be summarized into a control process 190, as shown in FIG. 19. The control process 190 may be implemented in a control circuit for controlling the knob, such as a touch and display driver integration (TDDI) circuit for controlling the display and touch operations of a touch panel and a knob thereon. The knob has a common pad corresponding to multiple touch sensors on the touch panel. As shown in FIG. 19, the control process 190 includes the following steps:

Step 1902: Detect a touch object on the knob by outputting a touch driving signal to the touch sensors.

Step 1904: Detect an operation of the knob by selectively outputting the touch driving signal or a reference voltage to the touch sensors.

The detailed operations and alterations of the control process 190 are described in the above paragraphs, and will not be narrated herein.

Figure 20:
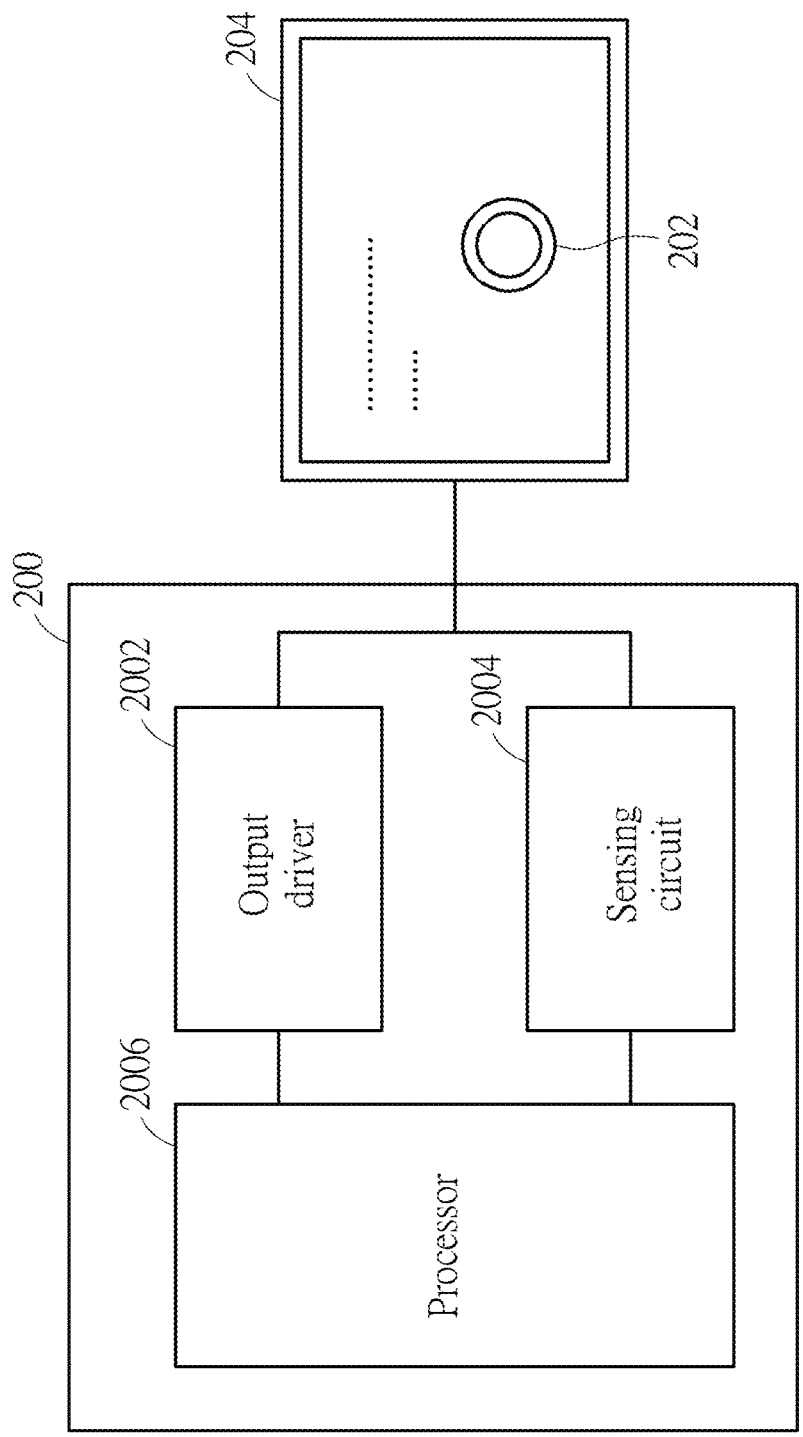
FIG. 20 is a schematic diagram of a control circuit according to an embodiment of the present invention.

FIG. 20 is a schematic diagram of a control circuit 200 according to an embodiment of the present invention. The control circuit 200, which may be used to control a knob 202 on a touch panel 204, includes an output driver 2002, a sensing circuit 2004 and a processor 2006. The knob 202 and the touch panel 204 controlled by the control circuit 200 are also shown in FIG. 20 to facilitate the illustrations. The control circuit 200 may be an integrated circuit (IC) implemented in a chip, such as a TDDI circuit. The knob 202 may be any knob having several sensing pads and a common pad as described in the above embodiments, but not limited thereto. The touch panel 204 may be a screen of the CID system of a vehicle, and may be an LCD panel or OLED panel, but not limited thereto.

As shown in FIG. 20, the knob 202 may be deployed on the touch panel 204 and contact a touch sensing region of the touch panel 204. For example, the knob 202 may be entirely installed on the effective touch sensing region of the touch panel 204, or installed at the border of the touch sensing region with partial knob body on the touch sensing region.

The output driver 2002 may output a touch driving signal to the touch sensors in the touch sensing region, except that the touch sensors below the common pad of the knob 202 may selectively receive the touch driving signal or a reference voltage (e.g., ground voltage) from the output driver 2002.

The sensing circuit 2004 may receive a sensing signal from the touch sensors in response to the driving signal. As described above, a sensing signal may be generated on the touch sensors below the knob based on whether a touch object is operating the knob, and also based on the rotational state and the press operation of the knob. This sensing signal may be output to the sensing circuit 2004 from the touch sensors. The sensing circuit 2004 may receive a sensing signal (if any) when the touch sensors are scanned (e.g., with the normal or knob scan timing as described above). The received sensing signal may be in the form of a voltage variation or voltage signal reflecting a capacitive variation on the corresponding touch sensor.

Subsequently, the sensing circuit 2004 may forward the sensing signals to the processor 2006, or convert the sensing signals into data to be forwarded to the processor 2006. The processor 2006 may thereby determine the state of the knob 202, e.g., the rotational and/or press state, according to the sensing signals. In an embodiment, the processor 2006 may determine the state of the knob 202 according to whether a sensing signal is detected or received from each touch sensor, including the touch sensors below the common pad and the touch sensors below the sensing pads of the knob 202. More specifically, based on whether a sensing signal is received from the touch sensors below the common pad, the processor 2006 may determine whether a touch object is operating the knob 202. Based on the touch sensors below which sensing pad (s) have a sensing signal, the processor 2006 may determine the rotational state and the press state of the knob 202.

In order to realize the above operations of knob detection, the processor 2006 may be configured with an algorithm for identifying the sensing signals. The processor 2006 may be any processing device, module or circuit included in an IC, such as a central processing unit (CPU), microprocessor, microcontroller unit (MCU), but not limited thereto.

Note that the present invention aims at providing a novel knob structure and related control method. Those skilled in the art may make modifications and alterations accordingly. For example, in the knob of the above embodiments, there are 1 common pad and 3 sensing or press pads. But in another embodiment, the knob may include any number of sensing pads (including a dedicated press pad or not). In addition, the position of the pads may be allocated on the knob in any appropriate manner, which should not be limited to those described in this disclosure. As long as the sensing pads may be selectively coupled to the common pad in an appropriate manner based on the operations performed on the knob, the related implementations of sensing pads along with the structural design of the knob should belong to the scope of the present invention.

As mentioned above, sometimes the touch sensors below the common pad may be applied with the reference voltage to facilitate the knob detection. Since most touch sensors on the touch panel are applied with the touch driving signal, if any touch sensor simultaneously receives the reference voltage instead of the touch driving signal, noises may appear on other touch sensors in the same row or the same column due to the coupling of traces on the touch panel. More specifically, when the reference voltage is output to a touch sensor through a trace, this voltage may be coupled to adjacent traces or lines that may correspond to the touch sensors in the same column or in the same row, thereby generating the noise interferences.

In order to avoid the noise interferences, in an embodiment, the common pad and other pads may be deployed in an appropriate manner so that these pads correspond to different rows and different columns of touch sensors, i.e., above different rows and different columns of touch sensors. Therefore, the reference voltage applied to the touch sensors corresponding to the common pad will not interfere with the signals on the touch sensors corresponding to other pads.

More specifically, if the common pad corresponds to a plurality of first touch sensors which are located in at least one row and at least one column of the touch sensor array, the other pads may be allocated in a manner so that none of the other pads corresponds to a second touch sensor located in any of the at least one row and none of the other pads corresponds to a third touch sensor located in any of the at least one column.

Figure 21:
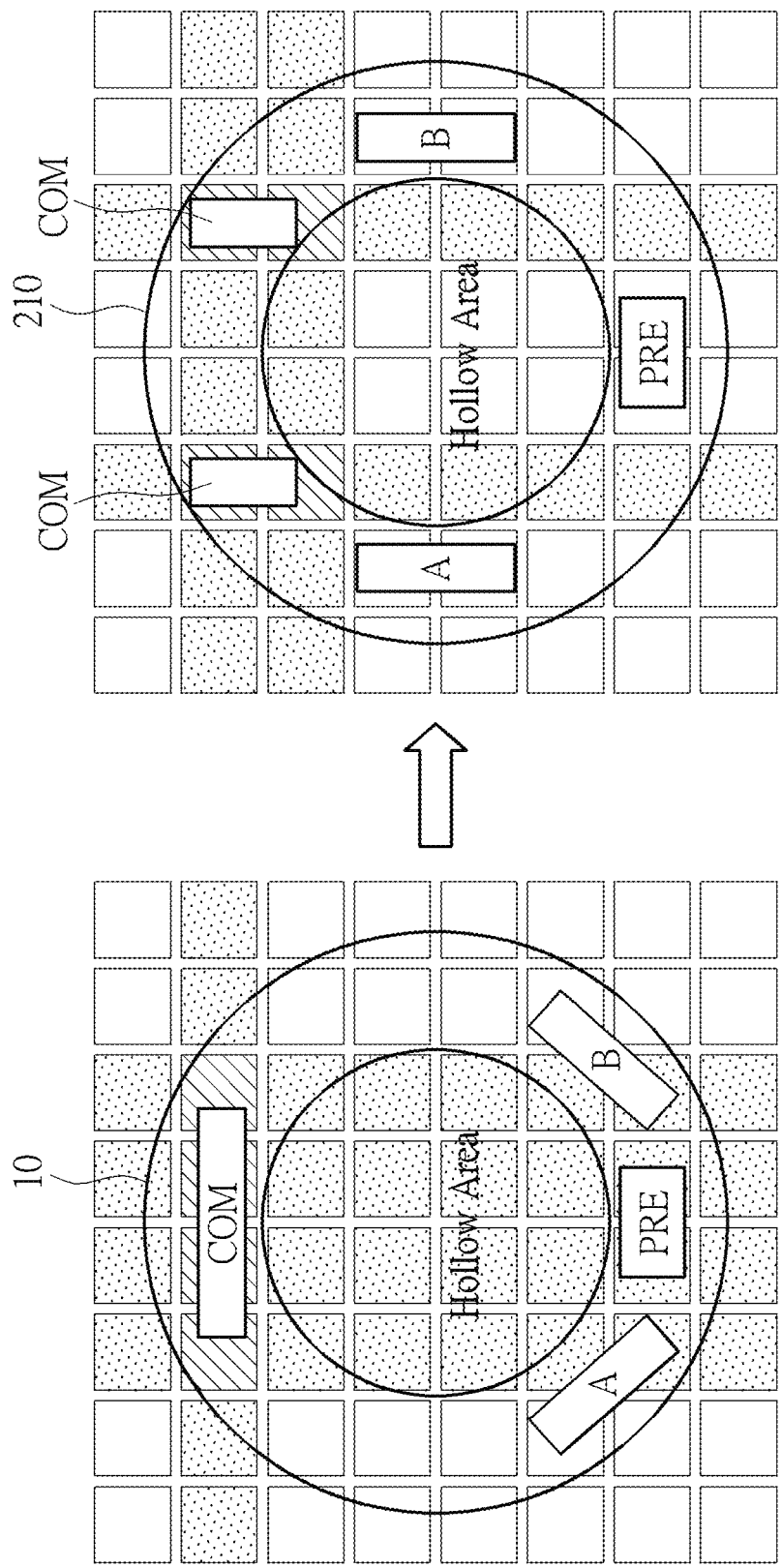
FIG. 21 illustrates an allocation of the pads on the knob to avoid the noises according to an embodiment of the present invention.

For example, FIG. 21 illustrates an allocation of the pads on the knob to avoid the noises according to an embodiment of the present invention. The knob 10 of FIG. 1 is redrawn in the left half part of FIG. 21, and it includes a common pad COM, two sensing pads A and B, and a press pad PRE. The knob 10 is deployed on a touch sensor array, among which each touch sensor is represented by a block. As shown in FIG. 21, the touch sensors below the common pad COM are marked with slashes, and the touch sensors that may be interfered with by the reference voltage to generate a noise are marked with dots. In the knob 10, each of the sensing pads A, B and the press pad PRE has several corresponding touch sensors at the same column with the touch sensors below the common pad COM, and thus the noise interferences are unavoidable when those touch sensors below the common pad COM are applied with the reference voltage.

In order to reduce or avoid the noise interferences, the pad deployment may be modified as in a knob 210 shown in the right half part of FIG. 21. In the knob 210, the common pad COM is separated into two parts, to be staggered with the position of the press pad PRE, i.e., to be deployed on different columns of touch sensors. In addition, the positions of the sensing pads A and B are modified to be above different columns of touch sensors from the common pad COM. In such a situation, all of the sensing pads A, B and the press pad PRE are deployed above the touch sensors at different columns and different rows from those touch sensors below the common pad COM, so as to avoid the noise interferences that may be generated from the reference voltage applied to those touch sensors below the common pad COM.

Figure 22:
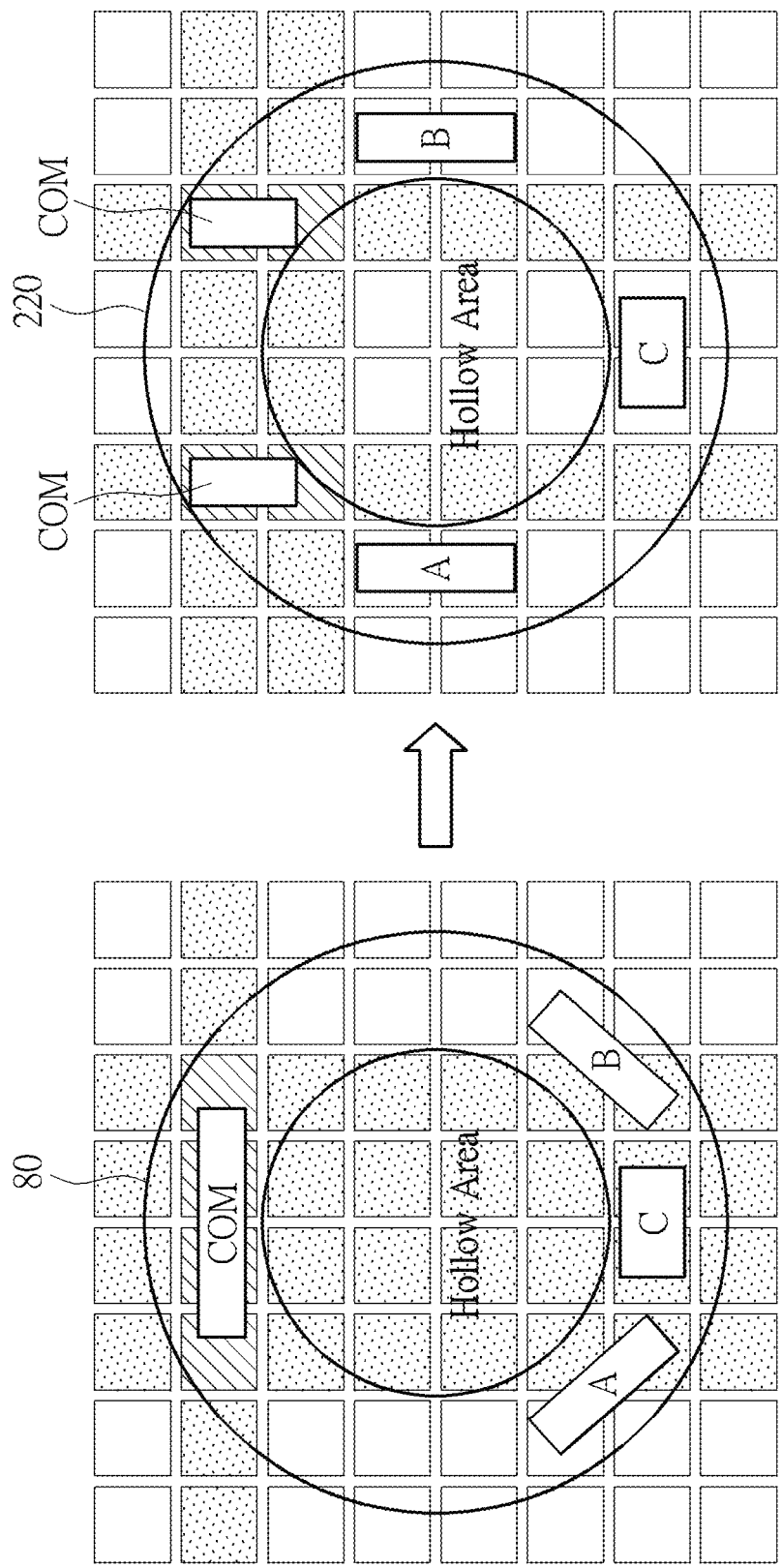
FIG. 22 illustrates another allocation of the pads on the knob to avoid the noises according to an embodiment of the present invention.

FIG. 22 illustrates another allocation of the pads on the knob to avoid the noises according to an embodiment of the present invention. The knob 80 of FIG. 8 is redrawn in the left half part of FIG. 22, and it includes a common pad COM and three sensing pads A, B and C. Similarly, the touch sensors below the common pad COM are marked with slashes, and the touch sensors that may be interfered with by the reference voltage to generate a noise are marked with dots. In the knob 80, each of the sensing pads A, B and C has several corresponding touch sensors at the same column with the touch sensors below the common pad COM, and thus the noise interferences are unavoidable when those touch sensors below the common pad COM are applied with the reference voltage.

In order to reduce or avoid the noise interferences, the pad deployment may be modified as in a knob 220 shown in the right half part of FIG. 22. In the knob 220, the common pad COM is separated into two parts, to be staggered with the position of the sensing pad C, i.e., to be deployed on different columns of touch sensors. In addition, the positions of the sensing pads A and B are modified to be above different columns of touch sensors from the common pad COM. In such a situation, all of the sensing pads A, B and C are deployed above the touch sensors at different columns and different rows from those touch sensors below the common pad COM, so as to avoid the noise interferences that may be generated from the reference voltage applied to those touch sensors below the common pad COM.

To sum up, the present invention provides a novel knob structure and related control method. The knob has a conductive ring deployed on the surface of the knob, to detect a touch object (e.g., a finger) operating the knob, where a touch sensing signal may be received from the touch object to realize the touch/finger detection. If the user operates the knob without wearing gloves, the touch sensing signal may be conducted to the knob through the contact of the user's finger. If the user operates the knob with a gloved hand, the touch sensing signal may be coupled to the conductor of the knob. As for other knob operations such as the rotation and press operations, the touch sensing signal from the touch object may increase the signal amount, allowing the control circuit to determine the operations of knob more easily and accurately, thereby improving the the knob reliability and performance of knob detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A knob on a touch panel, comprising:
a rotary wheel mounted on the touch panel;
a common pad deployed on the touch panel;
at least one sensing pad deployed on the touch panel;
a plurality of connectors, each coupled between the rotary wheel and one pad among the at least one sensing pad and the common pad, to control each of the at least one sensing pad to be coupled to the common pad or not through the rotary wheel according to an operation of the knob; and
a conductive ring deployed on a surface of the rotary wheel, to detect a touch object.

2. The knob of claim 1, wherein the conductive ring receives a touch sensing signal from the touch object when the touch object contacts or approaches the knob.

3. The knob of claim 2, wherein the touch sensing signal is coupled to the common pad through the conductive ring and the rotary wheel when the touch object approaches the knob.

4. The knob of claim 2, wherein the touch object is short-circuited to the common pad through the conductive ring and the rotary wheel when the touch object contacts the knob.

5. The knob of claim 1, wherein a touch sensor below the common pad is applied with a touch driving signal when the knob performs a detection on the touch object.

6. The knob of claim 1, wherein a rotational state of the knob is detected by receiving a touch sensing signal from the touch object.

7. The knob of claim 1, wherein the operation of the knob comprises a rotation operation.

8. The knob of claim 7, wherein the rotary wheel comprises a conductive region and an insulative region, and at least one connector for the at least one sensing pad among the plurality of connectors is coupled to the conductive region or the insulative region according to the rotation operation of the knob.

9. The knob of claim 8, wherein a first connector among the at least one connector is coupled to the conductive region when the knob is in a first rotational state, and coupled to the insulative region when the knob is in a second rotational state.

10. The knob of claim 8, wherein a second connector for the common pad among the plurality of connectors is coupled to the conductive region regardless of a rotational state of the knob.

11. The knob of claim 1, wherein the operation of the knob comprises a press operation, and the at least one sensing pad comprises a press pad.

12. The knob of claim 11, wherein the plurality of connectors comprise a connector for the press pad, to couple the press pad to the rotary wheel when the knob is pressed down.

13. The knob of claim 11, wherein the press operation is detected through the press pad by receiving a touch sensing signal from the touch object.

14. The knob of claim 1, wherein the plurality of connectors comprise a first connector and a second connector coupled between the rotary wheel and a first pad among the at least one sensing pad.

15. The knob of claim 14, wherein the first connector controls the first pad to be coupled to the common pad or not according to a rotation operation of the knob, and the second connector controls the first pad to be coupled to the rotary wheel or not according to a press operation of the knob.

16. The knob of claim 1, wherein the at least one sensing pad comprises three sensing pads, each coupled to two connectors among the plurality of connectors.

17. The knob of claim 1, wherein a touch sensor below the common pad is applied with a touch driving signal when the knob is in a first operation mode and applied with a reference voltage when the knob is in a second operation mode.

18. The knob of claim 17, wherein the reference voltage is a ground voltage.

19. The knob of claim 1, wherein when the common pad corresponds to a plurality of first touch sensors located in at least one row and at least one column, none of the at least one sensing pad corresponds to a second touch sensor located in the at least one row, and none of the at least one sensing pad corresponds to a third touch sensor located in the at least one column.

20. A method of controlling a knob on a touch panel, the knob having a common pad corresponding to a plurality of touch sensors on the touch panel, the method comprising:
detecting a touch object on the knob by outputting a touch driving signal to the plurality of touch sensors; and detecting an operation of the knob by selectively outputting a touch driving signal or a reference voltage to the plurality of touch sensors.

21. The method of claim 20, wherein the reference voltage is a ground voltage.

22. The method of claim 20, wherein the operation of the knob comprises at least one of a rotation operation and a press operation.

23. The method of claim 20, further comprising:
   detecting a signal amount of the touch object; and
   outputting the touch driving signal or the reference voltage to the plurality of touch sensors according to the signal amount.

24. The method of claim 23, wherein the step of selectively outputting the touch driving signal or the reference voltage to the plurality of touch sensors according to the signal amount comprises:
   outputting the reference voltage to the plurality of touch sensors when the signal amount is less than a first threshold; and
   outputting the touch driving signal to the plurality of touch sensors when the signal amount is greater than a second threshold.

25. The method of claim 20, wherein the step of detecting the touch object is performed in a first time slot arranged to scan an area on which the knob is deployed.

26. The method of claim 25, wherein the step of detecting the operation of the knob is performed in the first time slot.

27. The method of claim 25, wherein the step of detecting the operation of the knob is performed in a second time slot after the first time slot.

28. The method of claim 27, wherein in the second time slot, the reference voltage is output to the plurality of touch sensors.

29. The method of claim 20, further comprising:
   scanning the touch panel with a first scan timing when no touch object is detected on the knob.

30. The method of claim 29, further comprising:
   scanning the touch panel with a second scan timing different from the first scan timing when the touch object is detected on the knob.

31. The method of claim 30, wherein the plurality of touch sensors are applied with the reference voltage for the operation of the knob performed with the second scan timing.

* * * * *